(12) United States Patent
Pasken et al.

(10) Patent No.: US 9,274,251 B2
(45) Date of Patent: *Mar. 1, 2016

(54) APPARATUS AND METHOD FOR PROVIDING ENVIRONMENTAL PREDICTIVE INDICATORS

(71) Applicant: Saint Louis University, St. Louis, MO (US)

(72) Inventors: Robert W. Pasken, St. Louis, MO (US); William Dannevik, St. Louis, MO (US)

(73) Assignee: Saint Louis University, St. Louis, MI (US)

( * ) Notice: Subject to any disclaimer, the term of this patent is extended or adjusted under 35 U.S.C. 154(b) by 62 days.

This patent is subject to a terminal disclaimer.

(21) Appl. No.: 13/947,534

(22) Filed: Jul. 22, 2013

(65) Prior Publication Data

US 2013/0338920 A1 Dec. 19, 2013

Related U.S. Application Data

(62) Division of application No. 13/483,208, filed on May 30, 2012, now Pat. No. 8,494,774, which is a division of application No. 12/618,012, filed on Nov. 13, 2009, now Pat. No. 8,209,124.

(60) Provisional application No. 61/114,357, filed on Nov. 13, 2008.

(51) Int. Cl.
*G01W 1/00* (2006.01)
*G01W 1/10* (2006.01)
*G06F 11/00* (2006.01)

(52) U.S. Cl.
CPC . *G01W 1/10* (2013.01); *G01W 1/00* (2013.01); *G01W 2001/006* (2013.01)

(58) Field of Classification Search
CPC .................................. G01W 1/00; G01W 1/10
USPC ............................................................. 702/3
See application file for complete search history.

(56) References Cited

U.S. PATENT DOCUMENTS

| 6,085,152 A | 7/2000 | Doerfel |
| 6,208,938 B1 | 3/2001 | Doerfel |
| 6,498,987 B1 | 12/2002 | Kelly et al. |

(Continued)

OTHER PUBLICATIONS

Goodwin, L.C. "Best Practices for Road Weather Management," Version 2.0., Miterek Systems, May 2003 [Retrieved on: Dec. 18, 2009]. Retrieved from the Internet: <URL: http://ops.fhwa.dot.gov/weather/best_practices/CaseStudiesFINALv2-RPT.pdf>.

(Continued)

*Primary Examiner* — Phuong Huynh
(74) *Attorney, Agent, or Firm* — Stinson Leonard Street LLP

(57) ABSTRACT

A method of predicting weather-exacerbated threats, said method comprising inputting localized weather measurement data into a weather threat prediction system; predicting future localized weather conditions based on said localized weather measurement data combined with modeling from National Weather Service Data; inputting natural environment and infrastructure data into said weather threat prediction system; correlating said infrastructure data with said predicted future localized weather conditions; and determining a threat level index over a region, a threat level indicating an area having a certain probabilistic likelihood of being harmed by said future weather conditions.

14 Claims, 15 Drawing Sheets

(56) References Cited

U.S. PATENT DOCUMENTS

| | | | |
|---|---|---|---|
| 6,683,609 | B1 | 1/2004 | Baron, Sr. et al. |
| 7,079,631 | B1 | 7/2006 | Kaufman |
| 7,096,121 | B2 | 8/2006 | Intriligator et al. |
| 7,103,480 | B2 | 9/2006 | Intriligator et al. |
| 7,181,345 | B2 | 2/2007 | Rosenfeld et al. |
| 7,275,089 | B1 | 9/2007 | Marshall et al. |
| 7,365,674 | B2 | 4/2008 | Tillotson et al. |
| 8,210,467 | B2 | 7/2012 | Hubbell et al. |
| 8,494,774 | B2 * | 7/2013 | Pasken et al. ............ 702/3 |
| 2003/0025627 | A1 | 2/2003 | Wilson |
| 2004/0015336 | A1 | 1/2004 | Kulesz et al. |
| 2004/0230377 | A1 * | 11/2004 | Ghosh et al. ............ 702/3 |
| 2005/0136983 | A1 | 6/2005 | Agapi et al. |
| 2005/0154531 | A1 | 7/2005 | Kelly et al. |
| 2005/0197903 | A1 | 9/2005 | Hoffman et al. |
| 2007/0162328 | A1 | 7/2007 | Reich |
| 2007/0244644 | A1 | 10/2007 | Tanahashi |
| 2007/0276598 | A1 | 11/2007 | Tillotson |
| 2008/0027885 | A1 | 1/2008 | van Putten et al. |
| 2008/0076450 | A1 | 3/2008 | Nanda et al. |
| 2008/0087070 | A1 | 4/2008 | van Putten et al. |
| 2008/0097701 | A1 | 4/2008 | Zawadzki |
| 2008/0154655 | A1 | 6/2008 | Hartmann et al. |
| 2008/0293387 | A1 | 11/2008 | Conn et al. |
| 2012/0303278 | A1 | 11/2012 | Dannevik et al. |

OTHER PUBLICATIONS

Stouffer et al, Guide to Supervisory Control and Data Acquisition (SCADA) and Industrial Control Systems Security Recommendations of the National Institute of Standards and Technology, Sep. 2006, pp. 1-F-6, Special Publication 800-82, National Institute of Standards and Technology Technology Administration U.S. Department of Commerce.

Snook, et al., Local-Domain Mesoscale Analysis and Forecast Model Support for the 1996 Centennial Olympic Games; Weather and Forecasting, vol. 13, pp. 138-150, Mar. 1998.

Wang, et al., ARW Version 2 Modeling System User's Guide Chapter 3, Weather Research & Forecasting, Jan. 2006.

Steiner, et al., "Inversion, error analysis, and validation of GPS/MET occultation data", Annales Geophysicase, vol. 17, Issue 1, pp. 122-128, Dec. 1998. Retrieved on [Jul. 25, 2013]. Retrieved from the internet: <URL: http://hal.archives-ouvertes.fr/docs/00/31/65/10/PDF/angeo-17-122-1999.pdf> entire document.

Dannevik, et al., Local Area Forcing of Urban-to Regional-Scale Atmospheric Dispersion: Exchangin Fluxes in a Multiscale Environment, US Dept of Energy, Feb. 13, 2003.

User's Guide for Advanced Research WRF (ARW) Modeling System Version 2.2, Weather Research & Forecasting, Mesoscale & Microscale Meteorology Division, National Center for Atmospheric Research, Dec. 2006.

ARW, Version 2 Modeling System User's Guide, Weather Research & Forecasting, Mesoscale & Microscale Meteorology Division, National Center for Atmospheric Research, Jan. 2006.

McCaslin, et al., WRFSI User's Guide 2.1, Users Guide to the Graphical User Interface to Prepare the Standard Initialization for WRF Version 2.1, NOAA Research—Forecast Systems Laboratory, Boulder Colorado, Sep. 2005.

IBM Research, Deep Thunder Precision Forecasting for Weather-Sensitive Business Operations, Nov. 14, 2006.

Spiegler, Eye of the Storm, Introducing the pinpoint-precise local microcasts of IBM's Deep Thunder, www.wired.com, Issue 7.02, Feb. 1999.

National Geographic, Weather, Forecasting the Chaos of Weather, http://ngm.nationalgeographic.com/ngm/0506/feature5/multimedia.html, 2008.

Polaris Venture Partners, Polaris-Backed, AWS Convergence Technologies, www.polarisventures.com/Portfolio, 2004.

Steeneveld, et al., Exploring the Possible Role of Small-Scale Terrain Drag on Stable Boundary Layers over Land, Journal of Applied Meteorology and Climatology, p. 2518, vol. 47, No. 10, Oct. 2008.

Schmit, et al., The GOES-R Advanced Baseline Imager and Continuation of Current Sounder Products, Journal of Applied Meteorology and Climatology, p. 2696, vol. 47, No. 10, Oct. 2008.

Hamdi, et al., Inclusion of a Drag Approach in the Town Energy Balance (TEB) Scheme: Offline ID Evaluation in a Street Canyon, Journal of Applied Meteorology and Climatology, p. 2627, vol. 47, No. 10, Oct. 2008.

Ensor, et al., Statistical Characteristics of Daily Precipitation: Comparisons of Gridded and Point Datasets, Journal of Applied Meteorology and Climatology, p. 2468, vol. 47, No. 9, Sep. 2008.

Fisher, et al., Comparison of Synthetic Aperture Radar-Derived Wind Speeds with Buoy Wind Speeds along the Mountainous Alaskan Coast, Journal of Applied Meteorology and Climatology, pg. 1365, vol. 47, No. 5, May 2008.

Saxen, et al., The Operational Mesogamma-Scale Analysis and Forecast System of the U.S. Army Test and Evaluation Command. Part IV: The White Sands Missile Range Auto-Nowcast System, Journal of Applied Meteorology and Climatology, p. 1123, vol. 47, No. 4, Apr. 2008.

Basu, et al., Dynamic LES Modeling of a Diurnal Cycle, Journal of Applied Meteorology and Climatology, p. 1156, vol. 47, No. 4, Apr. 2008.

Weverburg, et al., Modeling the Contribution of the Brussels Heat Island to a Long Temperature Time Series, Journal of Applied Meteorology and Climatology, p. 976, vol. 47, No. 4, Apr. 2008.

Lundquist, et al., Interaction of Nocturnal Low-Level Jets with Urban Geometries as Seen in Joint Urban 2003 Data, Journal of Applied Meteorology and Climatology, p. 44 vol. 47, No. 1, Jan. 2008.

Klipp, Wind Direction Dependence of Atmospheric Boundary Layer Turbulence Parameters in the Urban Roughness Sublayer, Journal of Applied Meteorology and Climatology, p. 2086 vol. 46, No. 12, Dec. 2007.

Wang, et al., Nocturnal Low-Level-Jet-Dominated Atmospheric Boundary Layer Observed by a Doppler Lidar over Oklahoma City during JU2003, Journal of Applied Meteorology and Climatology, p. 2098 vol. 46, No. 12, Dec. 2007.

Frech, et al., High-Resolution Weather Database for the Terminal Area of Frankfurt Airport, Journal of Applied Meteorology and Climatology, p. 1913 vol. 46, No. 11, Nov. 2007.

Garand, et al., Interchannel Error Correlation Associated with AIRS Radiance Observations: Inference and Impact in Data Assimilation, Journal of Applied Meteorology and Climatology, p. 714 vol. 46, No. 6, Jun. 2007.

Zhang, et al., An Empirical Orthogonal Function Iteration Approach for Obtaining Homogeneous Radiative Fluxes from Satellite Observations, Journal of Applied Meteorology and Climatology, p. 435 vol. 46, No. 4, Apr. 2007.

Oku, et al., Estimation of Land Surface Heat Fluxes over the Tibetan Plateau Using GMS Data, Journal of Applied Meteorology and Climatology, p. 183 vol. 46, No. 2, Feb. 2007.

Jianping, et al, The Effects of Model Resolution on the Simulation of Regional Climate Extreme Events, Acta Meteorlogica Sinica, p. 129 vol. 21, No. 2, 2007.

Wenhua, et al., Validation of the Atmospheric Infrared Sounder Retrieval Products over China and Their Application in Numerical Model, Acta Meteorlogica Sinica, p. 141 vol. 21, No. 2, 2007.

Dupont, et al., Parameterization of the Urban Energy Budget with the Submesoscale Soil Model, Journal of Applied Meteorology and Climatology, p. 1744 vol. 45, No. 12, Dec. 2006.

Bedka, et al., Application of Satellite-Derived Atmospheric Motion Vectors for Estimating Mesoscale Flows, Journal of Applied Meteorology and Climatology, p. 1761 vol. 44, No. 11, Nov. 2005.

Miller, et al., Satellite-Based Imagery Techniques for Daytime Cloud/Snow Delineation from MODIS, Journal of Applied Meteorology and Climatology, p. 987 vol. 44, No. 7, Jul. 2005.

Higgins, et al., Advanced Weather Prediction Technologies: Two-Way Interactive Sensor Web & Modeling System, Phase II Vision Architecture Study, a report prepared for NASA's Earth Science Technology Office, Nov. 1, 2003.

Henmi, et al., Development of a Weather Running Estimate—Nowcast Capability for the U.S. Army IMETS, Army Research Laboratory, Sep. 2005.

(56) References Cited

OTHER PUBLICATIONS

Gutman, et al., Rapid Retrieval and Assimilation of Ground Based GPS-Met Observations at the NOAA Forecast Systems Laboratory: Impact on Weather Forecasts, 2003.

Skamarock, et al., A Description of the Advanced Research WRF Version 3, Mesoscale and Microscale Meteorology Division, National Center for Atmospheric Research, Jun. 2008.

Dudhia, A Nonhydrostatic Version of the Penn State-NCAR Mesoscale Model: Validation Tests and Simulation of an Atlantic Cyclone and Cold Front, American Meteorological Society, May 1993.

Shaw, B., et al., Implementation of the WRF Model for the Dubai International Airport Aviation Weather Decision Support System, American Meteorological Society, 2008, pp. 1-11.

* cited by examiner

Utility/Government Component

EAS Component

A representative sensor suite

EAS Process overview

National Weather Service date ingest process

Mesonet data ingest process

Main flow chart for QC process

Main flow chart for QC process (level 1)

Main flow chart for QC process (level 2)

Main flow chart for QC process
(level 3)

Mesonet Graphics pre-processor

Forecast model flow chart

Three Dimensional rendering of Forecast Data

APPARATUS AND METHOD FOR PROVIDING ENVIRONMENTAL PREDICTIVE INDICATORS

CROSS-REFERENCE TO RELATED APPLICATION

This application is a divisional application of U.S. Non-Provisional Divisional application Ser. No. 13/483,208—Filed: May 30, 2012, entitled Apparatus and Method For Providing Environmental Predictive Indicators To Emergency Response Manager, which is a divisional application of U.S. Non-Provisional application Ser. No. 12/618,012, filed Nov. 13, 2009, entitled APPARATUS AND METHOD FOR PROVIDING ENVIRONMENTAL PREDICTIVE INDICATORS TO EMERGENCY RESPONSE MANAGER, which claims the benefit of and priority to U.S. Provisional Patent Application Ser. No. 61/114,357, filed Nov. 13, 2008, entitled SYSTEM AND METHOD FOR PROVIDING ENVIRONMENTAL PREDICTIVE INDICATORS TO EMERGENCY RESPONSE MANAGERS, which aforesaid applications are hereby incorporated by reference in their entirety to the extent permitted by law.

BACKGROUND OF INVENTION

1. Field of Invention

The present invention generally relates to systems and methods for providing decision support predictive indicators that will create real-time probability impact information for decision makers and logistical managers when allocating resources and man power responsive to infrastructure repair, emergency events and/or natural resource issues, and more particularly to the impact of weather events on infrastructure, natural resources and/or environmental conditions.

2. Background of Art

Emergency Response Management are often the task of government agencies, utilities and businesses who are charged with responding in many crisis situations. The Federal Government utilizes the Federal Emergency Management Agency (FEMA) to respond to major catastrophes, such as hurricanes, earthquakes, nuclear accidents, tornados, wildfires and the like. On a more local level, utility companies tasked with providing essential services to consumers (power, water, gas, sewage) have created internal Emergency Management departments with the goal of responding quickly to outages often caused by weather events. In private industry, businesses which handle chemicals and other possibly harmful materials generally have created similar internal Emergency Management departments which deal with chemical spills and leaks and other environmental hazards.

However, often times such emergencies are created and/or exacerbated by weather conditions. Certainly, hurricanes and tornados are, in and of themselves, weather conditions which may cause tremendous destruction. Wildfires, chemicals released by leaks or spills, and radioactive waste released in nuclear accidents are all subject to be worsened by wind. Downed power lines are caused by high winds and flying/falling debris, such as tree limbs, or by ice storms. Floods are generally caused by high rainfall amounts. Thus, the weather conditions during these accidents and disasters are responsible for much of the associated danger and service outages.

Weather prediction should be an integral part of Emergency Response Management—knowing the present and future weather conditions can help Emergency Response Management to send resources not only to locations that are in need. However, current predictive techniques for weather patterns are generally performed on a national, or multi-state regional scale. This large scale weather prediction is largely insufficient for predicting the location of specific weather conditions with enough precision to ultimately assist Emergency Response Management personnel. Prior art weather monitoring stations are generally spaced 100-200 miles apart due to their expense and complexity. The wide spacing and skyward focus of these monitoring stations largely prevents them from monitoring ground conditions, and provides weather data accurate enough only to predict general weather patterns.

Many kinds of threats that the utility industry, natural resource managers, emergency responders and government agencies face are created and/or exacerbated by weather conditions. In particular threats created by high winds, icing, and lightning strikes are among the most difficult to predict and assess, because of their highly time-dependent geospatial distribution. The threat posed by the dispersion of chemicals released by leaks or spills, and radioactive waste released in nuclear accidents is also difficult to predict and assess, because of the highly time and space dependent weather conditions. Floods are generally caused by high rainfall amounts. Thus, the highly variable spatial and temporal variability of weather conditions play a crucial role in how the utility industry and government agencies respond.

The utility industry knows that weather plays in the long-term management of resources and has used long-term weather forecasts to plan the distribution of resources. However, the use of high spatial and temporal resolution short-term forecasts pin-pointed at specific regions has not been explored by either the utility industry or the government agencies charged with responding to natural or man-made disasters. Current weather numerical weather forecasts are generally performed on a national, or multi-state regional scale. This large-scale weather prediction is largely insufficient for predicting with enough precision the location and severity of weather conditions to provide actionable intelligence to the utility industry or emergency responders. Again, as noted above, prior art weather monitoring stations are generally spaced 100-200 miles apart due to their expense and complexity. The wide spacing of these monitoring stations largely prevents them from providing weather data at the local or neighborhood level, which is crucial for the utility industry and emergency responders.

The national or multi-state regional forecasts are insufficient for more localized weather prediction needed during an emergency. Detailed information about the character of the wind field over a neighborhood could be the difference between whether a school can be evacuated in time to avoid a poisonous chemical cloud, or whether it would be better for students to remain inside. Further, a difference of just a few degrees in temperature or a few miles per hour of wind speed over a distance of less than a mile could be the difference between a few power lines being downed versus hundreds of thousands of people in a heavily populated area being without power.

Accordingly, embodiments of the present invention provide for a system and method that monitors environmental conditions at locations spaced closer together than prior art monitoring stations. Thus, the greater number of monitoring stations in a smaller area provide for a higher resolution of weather data, allowing for a more precise and accurate forecast of conditions including weather data closer to the ground. When such weather data is correlated with relatively static infrastructure data, the present invention allows for a threat level index to be created which indicates the localities which are most likely to be threatened by the exacerbation of an event by the weather. Emergency Response Management may then use the threat level index to determine where and when to martial personnel.

BRIEF SUMMARY OF THE INVENTION

The present invention generally relates to systems and methods for providing decision support predictive indicators that will create real-time, detailed geographical distributions of the probability of the impact of weather events on infrastructure, natural resources and/or environmental conditions and more particularly to the impact of storm damage due to severe weather events (high winds, icing, and lightning strikes) to infrastructure, for example the utility industry infrastructure, or other infrastructure. The present invention also relates to systems and methods for prediction and assessment of air-borne pollen, agricultural pathogens, and hazardous materials for a variety of public and private agencies.

One or more of the embodiments of the present invention provide for a system and method for correlating localized weather predictions with relatively static infrastructure data. In a preferred embodiment, a network of monitoring stations input weather data into the Earth and Atmospheric Science (EAS) system. The network of monitoring stations can generally be referred to as a local Mesonet. These monitoring stations are spaced closer together than the 100-200 mile spacing of current monitoring stations, and are adapted to capture weather data more often than current monitoring stations, allowing for finer resolution of weather data. The monitoring stations or sensor suites can be remotely located and stand-alone systems with wireless transmission capability. The monitoring stations of the local Mesonet are also strategically placed based on certain parameters to optimize the efficacy of the stations and their respective data. The weather prediction system then utilizes this higher resolution weather data to predict the future weather conditions for an area, including future near-ground level weather. The processed data from the Mesonet is combined with weather prediction Mesoscale meteorological models operating on National Weather Service Data to predict the short-term weather at the neighborhood scale. Given a high spatial and temporal resolution meteorological forecast is made, the system combines the weather predictions with infrastructure data and/or natural environment data of the area to create a threat level index and a graphical map presentation of any threats. As will be understood by one skilled in the art, certain weather conditions combined with certain types of infrastructure can create emergency conditions. The threat level index is a probabilistic tool that rates areas in which certain infrastructure is likely to encounter certain, possibly hazardous conditions, and/or outages, which can result in a high probability of danger and/or service outage periods.

One embodiment of the present invention is to leverage on a Supervisory Control and Data Acquisition (SCADA) system of an electrical utility company. Many large electrical utility companies utilize a SCADA system to monitor and relay information related line status and other infrastructure status. The SCADA system utilized by electrical utilities usually utilize a series of substations that are distributed throughout the electrical utilities line and infrastructure system. The substations receive communications from various monitoring devices that are actively monitoring line status and the status of the other infrastructure. The substations receive the information transmitted to it wirelessly or by hardwire from the various monitoring devices. The substation can package the data received and transmit the status to a central server via an ethernet connection or other wide area network connection. The central server can process the information as well as transmit the information to other systems. This SCADA system can utilize the power lines to transmit data information or other means. In one embodiment of the present invention the SCADA system utilized by an electrical utility can be leveraged to transmit data from remote weather monitoring stations from any location were there are existing power lines. Utilizing SCADA will provide a comprehensive widespread network at low cost. The SCADA system can be equipped with electronic conversion devices that can wirelessly or via hardwire receive data transmission from remote weather monitoring stations and convert the data readings to a format and protocol that the SCADA system can handle and transmit. This embodiment is using the SCADA network available on the electrical power system in a way that was not intended but is quite effective in leveraging the SCADA electrical utility infrastructure to create a Local Mesonet network of weather monitoring stations that is comprehensive providing a high degree of spatial and temporal resolution that would be much more difficult and less cost effective to achieve without SCADA.

Therefore, one embodiment of the present invention can be a system for predicting weather-related threats, comprising an electrical utility infrastructure having a SCADA network adapted for monitoring and reporting infrastructure status including a plurality of substations dispersed throughout a region serviced by the electrical utility infrastructure, where said substations including a transceiver module operable to receive and transmit infrastructure status transmissions, and where said SCADA network includes a central server communicably linked to said plurality of substations and adapted to receive and process infrastructure status transmissions transmitted from the plurality of substations. The embodiment can further include a local Mesonet including a plurality of weather monitoring stations dispersed throughout the region serviced by the electrical utility infrastructure, where each weather monitoring station including weather condition sensors and transmitters adapted to transmit to the SCADA network data representative of the weather conditions sensed by the weather condition sensors. The central server can be communicably linked to a wide area network and adapted to transmit said data representative of the weather conditions over said wide area network. An electronic converter module integral with the SCADA network can be operable to receive and convert the data representative of the weather conditions and transmitted by the plurality of weather monitoring stations into a format and protocol that can be processed and transmitted by the SCADA network. An EAS computing system communicably linked to said wide area network and adapted to receive data representative of the weather conditions as transmitted by the central server can be adapted to present said data representative of the weather conditions to a user interface for user viewing.

In general SCADA refers to an industrial control system and is usually a computer based system for monitoring and controlling a process or equipment or infrastructure. The process can be industrial, infrastructure or facility based. As discussed above infrastructure processes may be public or private, and include water treatment and distribution, wastewater collection and treatment, oil and gas pipelines, the specific example above—electrical power transmission and distribution, and large communication systems. A SCADA System can usually include the following subsystems: A Human-Machine Interface or HMI is the apparatus which presents process data to a human operator, and through this the human operator monitors and controls the process; A supervisory (computer) system, gathering (acquiring) data on the process and sending commands (control) to the process; Remote Terminal Units (RTUs) connecting to sensors in the process, converting sensor signals to digital data and sending digital data to the supervisory system.

The term SCADA usually refers to centralized systems which monitor and control entire sites, or complexes of systems spread out over large areas (anything between an industrial plant and a country). Most control actions are performed automatically by remote terminal units ("RTUs") or by programmable logic controllers ("PLCs"). Host control functions are usually restricted to basic overriding or supervisory level intervention. For example, a PLC may control the flow of cooling water through part of an industrial process, but the SCADA system may allow operators to change the set points for the flow, and enable alarm conditions, such as loss of flow and high temperature, to be displayed and recorded. The feedback control loop passes through the RTU or PLC, while the SCADA system monitors the overall performance of the loop.

Data acquisition begins at the RTU or PLC level and includes meter readings and equipment status reports that are communicated to SCADA as required. Data is then compiled and formatted in such a way that a control room operator using the HMI can make supervisory decisions to adjust or override normal RTU (PLC) controls. Data may also be fed to a Historian, often built on a commodity Database Management System, to allow trending and other analytical auditing. SCADA systems typically implement a distributed database, commonly referred to as a tag database, which contains data elements called tags or points. A point represents a single input or output value monitored or controlled by the system. Points can be either "hard" or "soft". A hard point represents an actual input or output within the system, while a soft point results from logic and math operations applied to other points. (Most implementations conceptually remove the distinction by making every property a "soft" point expression, which may, in the simplest case, equal a single hard point.) Points are normally stored as value-timestamp pairs: a value, and the timestamp when it was recorded or calculated. A series of value-timestamp pairs gives the history of that point. It's also common to store additional metadata with tags, such as the path to a field device or PLC register, design time comments, and alarm information.

A Human-Machine Interface or HMI is the apparatus which presents process data to a human operator, and through which the human operator controls the process. An HMI is usually linked to the SCADA system's databases and software programs, to provide trending, diagnostic data, and management information such as scheduled maintenance procedures, logistic information, detailed schematics for a particular sensor or machine, and expert-system troubleshooting guides. SCADA solutions often have Distributed Control System (DCS) components. Use of "smart" RTUs or PLCs, which are capable of autonomously executing simple logic processes without involving the master computer, is increasing. A functional block programming language, IEC 61131-3, is frequently used to create programs which run on these RTUs and PLCs. Unlike a procedural language such as the C programming language or FORTRAN, IEC 61131-3 has minimal training requirements by virtue of resembling historic physical control arrays. This allows SCADA system engineers to perform both the design and implementation of a program to be executed on an RTU or PLC.

For example, in one embodiment of the present invention, the predictive indicator system provides a threat level index for a weather event to a municipal electric utility company. Infrastructure data including the location of above-ground power lines and trees can be infrastructure and natural environmental inputs into the system. The system can then analyze the likelihood that winds over a certain speed will occur and/or that icing will occur in an area where both above-ground power lines and trees are present. Where it is determined that all three of these factors are likely to overlap, a high threat level is assigned. Thus, an Emergency Management Center of an electric utility company can be notified and therefore, be able to decide where and when to martial manpower and how much manpower to allocate before the crisis or outage arises.

As another example, in another embodiment, the predictive indicator system provides a threat level index for a weather event to a sewage department. In such a situation, the static infrastructure data may include data regarding the location and capacity of waterways and drains, and possibly the topology of the area. The system would be able to predict the location of heaviest rainfall in a city and the direction the rainwater would travel once on the ground, and determine whether the sewage department would then need to reroute certain waterways to attempt to load-level the rainfall volume across a larger portion of the city. Thus, Emergency Response Management would be able to decide in advance where and when to reroute such waterways.

As a third example, in another embodiment, the predictive indicator system provides a threat level index for an environmental hazard, such as a chemical spill, or for a major catastrophe, such as a nuclear accident. In such a situation in which a harmful agent is released into the air, the location and amount of the release would be input into the system, along with infrastructure data such as the location of schools and heavily populated areas. When the location and volume of the release is correlated with the wind direction and speed (and possibly with rain movement and humidity index in the case of a water soluble release), a threat level can be assigned to those areas with the highest populations and/or highest chance of encountering the release cloud. Further, knowing precisely what the speed of the wind will be with fine resolution allows for the calculation of the probable amount of time it will take for the release cloud to encounter infrastructure. Thus, a FEMA and/or a business's Emergency Response team would be able to decide where and whether to evacuate, and where to send the evacuees.

As a fourth example, in another embodiment, the predictive indicator system provides a threat level index for a fire created by a major catastrophe, such as a fire caused in the wake of an earthquake or other natural disaster, or possibly a wildfire. In such a situation in which fire is spreading, the location and size of the fire would be input into the system, along with infrastructure data such as the location of other flammable material, chemical holding facilities, heavily populated areas, etc. When the location and size of the fire is correlated with the wind direction and speed (and possibly with humidity and rainfall), a threat level can be assigned to those areas with the highest populations and/or highest chance of the fire spreading. An examination of previous localized rainfall and topography can also be utilized. Further, knowing precisely what the speed of the wind will be with fine resolution allows for the calculation of the probable amount of time it will take for the fire to encounter infrastructure. Additionally, wildfires caused by lightning could be predicted by correlating very dry areas with the specific areas predicted to encounter heavy lightning. Thus, a FEMA will be able to decide where and whether to evacuate, and to where to send the evacuees.

The EAS process includes a network of weather stations deployed in key locations throughout the region that measure various conditions, including temperature, humidity, atmospheric pressure, wind speed and rainfall rates. These stations can be solar-powered and can continuously feed information to a central site where the data is quality-controlled. The quality-controlled data is then placed in a database where it can be accessed by other tools with the EAS process to create graphics of the existing conditions and for use in numerical weather prediction models. The Mesonet data and the high spatial and temporal resolution meteorological forecast is not the only method utilized to understand and create an assessment of the current and predicted weather, and to assess the risk that the weather posses to the utility industry and to the government agencies responsible for emergency management.

To properly assess the current and predicted weather and to assess the risk, the temporal and spatial resolution is maximized and the current and predicted meteorological fields are used to derive and display parameters such as divergence, vorticity, moisture advection, velocity shear and deformation, and gradient wind strength. Using the EAS process developed tools a clear and decisive assessment of the current and predicted weather and the risk this weather poses can be clearly understood and delineated. The mesonet stations are also strategically placed based on regional characteristics, known geophysical trends or conditions, maximizing spatial and temporal resolution and the relevant application. The EAS process develops a characteristic scheme that utilizes regional information including topography, climatology and infrastructure, high spatial and temporal resolution information and application. The meteorological fields described and how they would be combined should be apparent to one, skilled in the art area as they review the entirety of this specification.

Using the analysis created by the EAS process, an indication of those areas most at risk for losing power or other threat is produced. The system rates the probability of power loss or other threat in individual local areas on a scale from 1 to 100. A state of the art weather prediction model (WRF) is tuned to fit the local conditions by choosing, from the many possible choices of parameterization schemes, those parameterizations schemes that, when combined, provide the best possible forecast. The present invention determines which combinations of parameterization schemes that produce the highest spatial and temporal correlation factors for the application, spatial and temporal resolution and region between the forecasted weather conditions and observed weather conditions. Possible parameterization scheme options reflected in Appendix 1 and a representative determined scheme is reflected in Appendix 2.

The larger scale numerical weather forecasts from the National Weather Service are combined with the quality controlled high spatial and temporal resolution data from the Mesonet using the model initialization tools produces a significantly improved WRF model initialization that creates a forecast with the highest spatial and temporal correlation factors between observed and forecasted weather data. The high spatial and temporal resolution weather forecast is combined with the location of overhead power lines, and tree density and other natural obstructions or terrain and type to create an index that provides the power industry or other relevant user with an indication of the precise location of threatened areas, when these areas will be affected and for how long. This high spatial and temporal index allows the utility industry to preposition equipment and crews to minimize the disruption to the infrastructure. The advanced warning also allows the utility industry and other entities requiring emergency response management to maximize the allocation of personal. When applying the EAS system to other applications other infrastructure, topography and natural environment features may be used.

The EAS Process creates accurate, location-specific weather hours ahead of storms, thus users will be better prepared for severe weather. This system is tied to information on trees (and other natural environmental conditions such as for example—terrain and elevation) and power lines (and other infrastructure, such as for example roads or man-made obstructions and structures that can impact the readings of sensor stations or impact of local weather), it also enables users to more readily—and quickly—identify areas that have been hardest hit by outages or damage. Data such as population density, housing density, critical facilities, pedestrian and vehicle traffic can be utilized. This is a more efficient use of financial and human resources and will significantly improve the company's response and restoration time for customers, improving system reliability.

The system's usefulness extends beyond pinpointed weather forecasting and the utility industry, the utility industry is utilized throughout the specification as an illustrative example, but in no way limits the scope of the present invention. For example, because the system constantly monitors wind conditions, the system would have the ability to predict the path of a cloud of hazardous material in the event of an industrial accident or bioterrorism attack.

BRIEF DESCRIPTION OF THE DRAWING

For a better understanding of the present invention, reference may be made to the accompanying drawings in which.

DETAILED DESCRIPTION OF THE INVENTION

Figure 1:
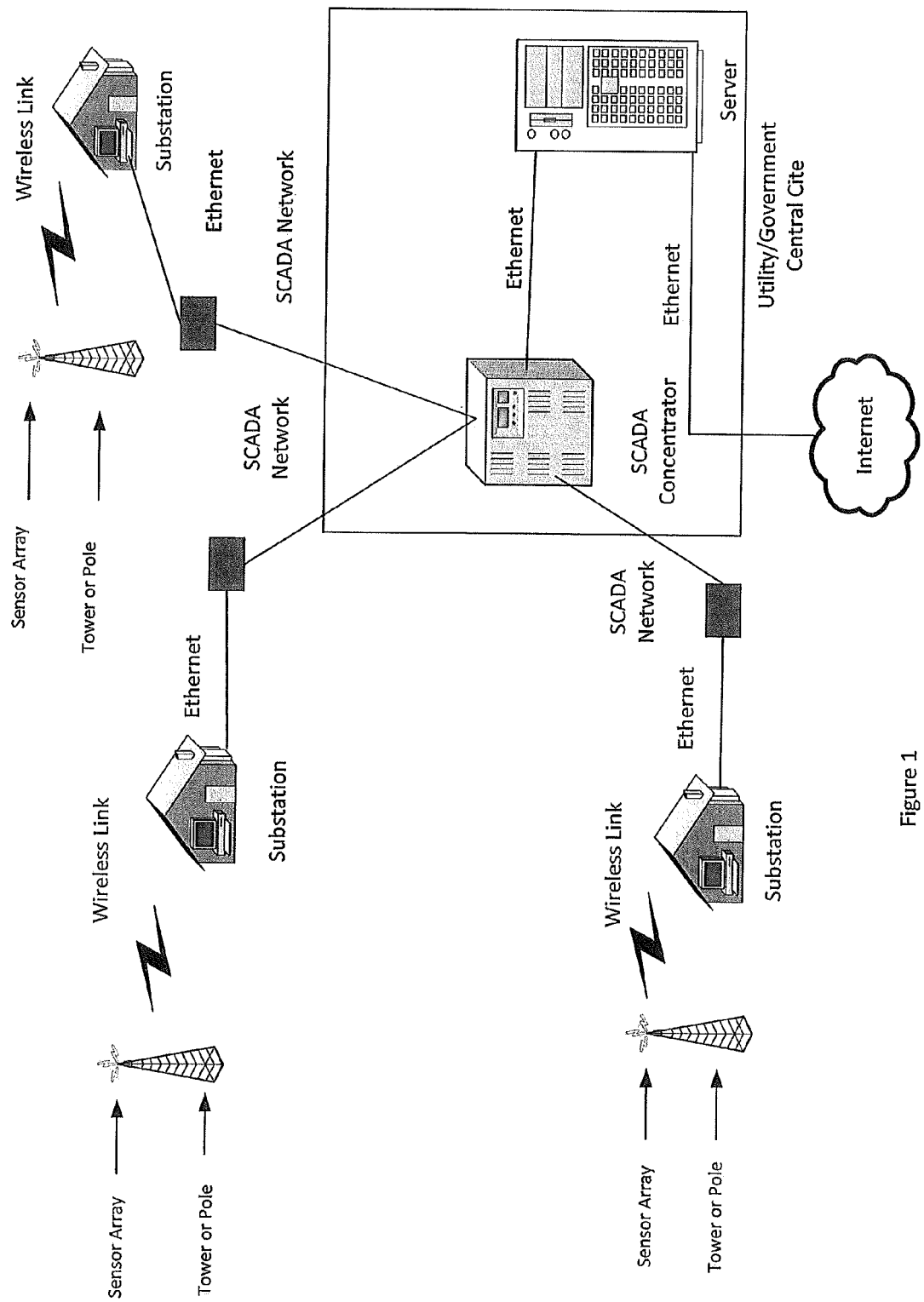
FIG. 1 is an illustration of EAS network environment.

According to the embodiment(s) of the present invention, various views are illustrated in FIG. 1-9 and like reference numerals are being used consistently throughout to refer to like and corresponding parts of the invention for all of the various views and figures of the drawing.

Data from all over the entire globe is typically utilized in order to make a forecast. Meteorological forecasting is performed in a global fashion. Global forecast data is available to forecasters around the world. There is a very large global model referred to as GFS, which stands for the Global Forecast System. Unfortunately, it is difficult to make that model work on a localized level in order to predict weather events accurately because the resolution of the model is very coarse—lacks sufficient resolution. Further, such a forecast system lacks the ability to factor in local parameters that may affect the accuracy of a prediction and further predict the impact that the weather event may cause. Depending on the season of the year the resolution can vary and can be somewhere between 40 and 50 kilometer resolution. This resolution is inadequate for use in a highly localized forecasting model. The important features that are of interest are missed. That is a common problem with all groups that make use of these weather forecasts. The resolution from this global forecast model is too coarse.

In order to solve the problem, individual groups have attempted methods of nesting one model with another. A larger global forecast system model is generated and then nested with a model generated across the continental United States, and further the National Weather Service runs yet another model that's called the North American Meso Model, or sometimes referred to as NAMM. That's a finer resolution model and it's updated more often. However this level of nesting is still not good enough for the kinds of forecasting that is addressed by the present invention because the resolution is still too coarse and can not be manipulated or extrapolated as needed and still does not factor in local parameters that may affect the accuracy of a prediction and further predict the impact that the weather event may cause. However, as the invention is further described herein, it will become apparent that increased resolution by itself particularly at this level also is not sufficient. However, the resolution resulting from nesting to this level is fine enough that it can be utilized by the present invention if the proper initialization and pre-processing is performed by the present invention and combined with the local Mesonet data of the present invention to create the present invention's WRF model, which stands for Weather Research Forecasting model. The finer resolution of the WRF model can better controlled, manipulated, parameterized and modified. By utilizing the present invention, the fineness of the resolution both in space and time can be selected by the user.

Although more information is needed than either of these two models nested can provide me, the present invention can utilize the information to create what can be referred to as boundary conditions. The boundary conditions can be modeled as a cube or a matrix of cubes, which define boundaries over which the present invention can be utilized to perform forecasting. The cube or boundary can be considered a geographic region and the nested data as described can be utilized to determine what the conditions are along the edges of this model.

Conditions defined along the edges create a boundary for my model. The boundary includes a lower boundary or something at the ground as well as something along each of the side edges. Some of the information can be properly extracted by the EAS system from the medium resolution model. Additional information can be captured from the EAS systems local mesonet that has been strategically installed and implemented. The EAS system can also capture geographic information from a geographic data base. And this geographic data base can include topography, soil type, soil moisture, soil temperature and other relevant climatological geographic information from a climatological model. Further, land use information can be extracted such as for example—it's a farm, it's a highway, it's a baseball stadium. Topography, soil type, moisture, temperature, land use information and other like information can be extracted in order to describe the lower boundary of the model, or if you will, domain. The cube or other practical geometry that is utilized by the EAS system can be referred to as the model domain. In the case of a cube, the model has six sides to the domain. Four edge domains can be extracted from the coarser or medium scale forecast. The bottom can be extracted from the above mentioned geographic database information, which was developed as part of the WRF model. It has a resolution of about approximately 30 arc-seconds which is what. This allows for very fine transitions in the environment to be discerned. The topography data is available from databases such as the database generated by the National Defense Mapping Agency.

The EAS system can be utilized to determine the pieces of that geographic database that is need for a particular model domain. The Geogrid routine of the EAS computing system can be utilized to take the definition of the domain or model domain. The Geogrid can access the database and extracts out of it the information that is needed to describe the bottom portion of the domain referred to as the lower boundary condition. The domain can be changed and the Geogrid can adapt the domain accordingly. This domain can be changed and defined based on need. It is this ability to adapt the domain and the prediction need that drives the location of the stations. The need can be time and spatial dependent, in other words—on one hand how far in advance is the forecast needed or the forecast time window, and this can be general referred to as the temporal resolution. There's a second portion of the resolution that has to do with spacing or spatial resolution. This again is driven by need. For example the forecasting need for a large municipal electrical utility that is concerned about the impact inclement weather may have on their infrastructure, the spatial resolution needed can be about approximately 9 kilometers. The temporal resolution in this example can be about approximately 15 to 20 minutes. So as the need changes the Geogrid can be utilized to modify the domain. So the parameters that are utilized for the Geogrid come from the definition of the need. The Geogrid can be a computer implement function or routine.

An additional piece in the EAS system is a program or function referred to a Ungrib. Unigrib takes the large coarse domain and decodes it. National Weather Service, for example, broadcasts this weather data information for access. The data is usually shipped as a large data file that is compressed and can be generally referred to as a GRIB file, which stands for a gridded binary file. The UnGRIB function decompresses the file. Then, Metgrid takes the lower boundary condition, and it takes the lateral boundary conditions generated by UnGRIB and imports the information into the defined domain. Now all of the boundary conditions that surround the defined domain have been modeled. The EAS system now has an accurate description of the initial conditions and the boundary conditions for the model domain.

The MetGRID, GeoGRID, and UnGRIB functions can be generally referred to as the Mesonet pre-processor function. Another component of the Mesonet pre-processor function is the quality control function that operates on the Mesonet data. The Metgrid processer takes all of that information, and transforms the data into the conditions that are necessary for the EAS system to run my model. An advantage that is provided with the EAS system is the information that goes into Metgrid function is processed by the quality control function which performs a quality control function on the mesonet data. The EAS system, also generally referred to as the Quantum Weather system, utilizes data from the EAS local mesonet and refines the data and provides a quality control function. The EAS system incorporates all the extra local mesonet provided information that is at a much finer scale. A function of the EAS system is import mesonet data into Metgrid. However, the pre-processing including quality control provides for greater accuracy. The pre-processor function can be implemented with a computing system comprising the computing elements and components and functional computing modules illustrated in FIGS. 4, 8 and 9*a*.

For example, a lot of information that comes out of this mesonet is affected by things that aren't related to the weather. A classic example is when a municipal utility company has infrastructure that is downwind from a very large sign or other like obstruction on the side of the interstate such that the sign or other obstruction acts somewhat as a windshield. Even if a wind sensor is located in the area, the wind seen at the infrastructure will differ from that seen in the immediately surrounding area. The same thing can occur with building or natural obstructions. The EAS system can also perform other quality control functions like making adjustments for sensor station placement or making adjustments when there is an atmospheric tide in the atmosphere that actually causes the pressure—even when there is no weather—to vary in a cyclical manner, or making adjustment when the wind direction, wind speed, the temperature and pressure are correct, but the relative humidity always reports zero. In addition to the quality control function and the Mesonet pre-processor function also performs an assimilation or ingest of data function, where Metgrid incorporates data into the model.

The domain as described above can be broken up into a series of little cubes. Viewing the domain from the top down picture shows a grid of squares. However, sampling of the atmosphere, is not only just on the ground, but is also vertical. The method that EAS uses to solve the equations forward in time requires that we have the information (initial conditions) at regular uniform intervals in space, and these cubes should be uniform in size. They all should be the same size and information is needed at the cube intersections. However, typically sensors, thus data, is not available at those grid intersections. For example, typically one of the biggest users of weather information in the '20's, '30's, '40's and '50's was airports. Therefore, a majority of the National Weather Service observations are taken at airports. So typically sensor station have been somewhat clustered around major cities, thus not importable in a uniform grid. Importing the information or data into a nice rectangular uniform grid can be referred to as an objective analysis.

Therefore, not only are the stations from the National Weather Service irregularly spaced, they are also not strategically space for the local mesonet. Therefore, the ability to transform the information in an objective fashion onto the individual grids is problematic. With the present invention, there is an objective analysis method that is used to perform this function. There is a method that is utilized by the EAS system that can generally be referred to as the ObsGRID function that transforms all of the information from an irregularly spaced network of stations and puts imports the information on uniform cubical grids in a fashion that is sufficiently accurate for the necessary predictions. A Nyquist sampling technique can be utilized, which can be used along with a Barnes and/or Cressman sampling technique. This transformation is necessary for the ingest process.

ObsGRID transforms the data in a manner that can be ingested by MetGRID. Obsgrid generates something that Metgrid can read and it takes all of the pieces together, this material from the objective analysis, the National Weather Service, the lower boundary conditions, describing the topography, the land use, the soil moisture, soil temperature, and all other information, and combines it together to produce for the domain, a model domain, having lateral and lower and initial boundary conditions. The model boundary conditions describe the initial state of the atmosphere. In order for this model to work for prediction purposes, the EAS system accurately describes the state of the atmosphere when the model starts, which can be referred to as initial conditions. Further, the EAS system updates data at such a frequency that ability to initialize the model at an arbitrary instance in time is highly selectable. Typically previous systems could only initialize a forecast model at six (6) hour intervals and the upper atmospheric conditions may be data from a previous 12 hour interval. As indicated above sampling of the atmosphere with the EAS system occurs not only just on the ground, but it is also performed in the vertical as well. Therefore, EAS has strategically placed stations that samples in the vertical, which differs from the National Weather Service. So the data is in a full three dimensions. In addition to the three dimensions the EAS system, as discussed above can initialize the model at selected arbitrary times, which adds what can be referred to as a fourth dimension—three spatial dimensions and one in time, as well. So EAS is working in four dimensions and not just three because of the near real time data.

When the EAS is developing a forecasting model, the parameterization scheme can be tuned to address the specific forecasting need. For example, if high winds are of concern because of a potential adverse impact on an asset of concern then the EAS system must be able to forecast with a high level of accuracy the location of the high winds. To do an accurate forecast the EAS system will need to make sure to tune the model to produce the highest quality convection, i.e., the thunderstorms and clouds, and associated with that highest quality convection cloud forecast, a high quality wind forecast. Different parameterization schemes may be selected in order to optimize the forecast. Different parameterization scheme may be different depending on the different forecast need. Further, the EAS local Mesonet data can provide near real-time conditions such that the selection of the parameterization scheme can be based on that real-time information. There are generally four (4) categories of parameterization schemes—Surface Layer Parameterization having three (3) schemes, Boundary Layer Parameterization having four (4) schemes, Micro-physics having eight (8) schemes, and Cumulus having six (6). For example if a municipal electrical utility has a need where they are concerned about damage to assets caused by high winds, then EAS can select a parameterization scheme optimized for convection and the high winds associated with it. That now chooses how EAS will parameterize certain features within the model.

An example of how a parameterization scheme works is as follows, if EAS defines on of the cubes in the model as 1 kilometer on the side and 500 meters tall. For some clouds—or for some types of clouds—the system would completely fill this cube with the cloud, and may even extend the cloud on either side of the cube in the model. In which case, the system can describe the processes within the cloud very easily with this 1 kilometer cube. However, what happens when there is just the beginnings of a thunderstorm and it just begins to start up, and it just fills up only a portion of that 1 kilometer cube. The system couldn't describe accurately that cloud entirely. However the system can explain or describe its effects on what's going to happen within this 1 kilometer cube. There is a method that can be used such that even though it can't see the cloud itself, it can see the effects of the cloud on that particular cube. That's known as a parameterization scheme.

As mentioned above, there are various types of parameterization schemes, such as for example, there's a boundary layer parameterization scheme. Very close to the ground, for example, there is a layer that is about approximately 500 meters deep or typically 500 meters deep. There can be a lot of turbulence within that 500 meter layer. The system can't describe all of that turbulence within that little 500 meter depth, but it can tell you what effect that turbulence has on this one whole block of the atmosphere—this one little 1 kilometer cube. So there's a boundary layer parameterization. There is also a cumulus cloud parameterization. Inside of clouds, there's this whole process where ice is converted into—well, I raise air up in the atmosphere, it cools off, it forms water, it forms ice droplets, it rains. That process is far too small scale to describe on this 1 kilometer square, however, it can describe the effects of that process on what's happening inside that cube. Those are known as parameterization schemes.

The model can provide choices. If running the model at a very fine resolution, 200 meters, then do not need a cumulus parameterization scheme. The system can accurately describe the cumulus clouds at 250 meters. The model allows for choices to be made. For the boundary layer, if data is available, the Metgrid/Obsgrid process will allow the first 500 meters to be described if the observations are available. The model and the Obsgrid is generalized and flexible enough so that it can get the data, it can be process and the parameterization scheme can actually be removed and the boundary layer can be describe exactly. The actual real-time data from the EAS local Mesonet can provide information. Therefore, the system is flexible enough that it can choose between just describing the effects or actually reproducing whatever is happening there in the atmosphere completely.

A database of the most effective parameterization schemes for a given need can also be assembled and accessed by running the model with and without various surface layer parameterizations with and without cumulus parameterization and by taking a look and verifying the quality of the forecast for each one of these possible choices of parameterization schemes. Within, for example, the cumulus parameterization, there is actually a selection—there's three or four options that can be chosen—there's three or four different cumulus parameterization schemes and you can pick one. Or you could pick the other. Or you could pick none and actually reproduce the atmosphere entirely. The net result is a decision about—for a specific problem, what particular choice provides the best quality forecast, and the outcome would likely be different for different applications. The refinement of the optimization of the parameterization scheme is something that is an on going process. There is an automated tool that generates a skill score that rates the effectiveness of a parameterization scheme for a given need. The EAS system can review the skill score daily and so long as nothing happens or that skill score doesn't change dramatically, the system will have no need to make corrections. Other times, it is a flaw within the model or the parameterization scheme itself, which can be corrected.

There are different forecast and prediction needs depending on the asset of concern. In the case of a municipal electrical utility the assets of concern may be power lines and the like and the threat of concern may be icing. Typically an 8 hour window of warning is need to appropriately plan for such a weather event. However, in the case of a sporting event you may need less than an hour window of notice. For example, in the case of a baseball event you may need only about 5 minutes or 10 minutes warning to cover the field. In other words—what is happening now in the nearby surrounding area. The local mesonet of the EAS system will solve this problem and actually will watch the progression of the storm move across the local mesonet and when it gets to about 10 minutes away, for example, can provide adequate warning.

So part of the solution provided by EAS to the question of how big the domain is and how to place stations is very dependent on the particular problem that is trying to be solved. It is a time problem in the sense of how much is needed. It is also a spatial problem because EAS must determine how much spatial coverage is needed or how far to go back to get enough upwind or upstream data. So, the placement of the sensor stations for EAS is dependent in space and time on how much lead time is needed. There is a spatial and temporal resolution. The location of assets of concern is also a driver for placement of the sensor stations. Further, unique natural or land-use or infrastructure conditions can be a driver as well as known prediction problems. EAS has an optimization scheme to address the various needs.

There also may be areas of interest were EAS has determined an effective parameterization scheme in a particular region is not feasible thus actual data is needed thus driving the placement of sensor stations in the local mesonet. EAS is designed with locations to fill in gaps where information is needed to have an answer to or description of conditions so that EAS can report what is actually happening on a regular basis based on what is seen across the network in terms of how much longer, for example the icing event, is going to continue and how heavy the icing was going to be and how fast is it accumulating. The EAS system also allows for user input to make adjustments just based on user knowledge of current conditions or historical knowledge. Thus a user can alter the boundary layer parameterization scheme. There's a different choice for that particular combination. And so there's a list of these, all of these combinations that we, you know, have, there's this great big table that says if this is happening, then go pick this particular set of parameterization schemes.

EAS can also provide a threat index for an event that is designed to identify problem areas of interest that merits action or a closer watch. The threat index level can be determined by considering a combination of three factors including 1.) the type of asset; 2.) weather conditions that can potentially place the asset at risk; and 3.) special conditions in the area that can potentially amplify the threat. In the case of an electrical utility, the asset could be power lines or high tension towers. The weather conditions could be icing or high winds. The special conditions could be trees hanging over the power lines. The threat index could be a level rating of 0 to 100 where 100 is the highest threat level. EAS determines at what geographic locations and what predicted times will all three of those conditions exist and attach to that a number.

Therefore, for example, if you have winds of about approximately 70 miles an hour predicted 3 hours from now in a particular location and you there are overhead structures in the area and they have trees located there that are full of leaves and the soil moisture is high,—this will likely result in a very high threat index. However, if you have a location where there's hardly any trees and there's no overhead lines because it's all new construction, then the threat index would be substantially lower. A map grid of an area can be generated and the threat index data can be overlayed over the map. A graphical representation of high winds or icing for example can be provided as well as color high-lighting various regions having various threat indexes. The map will evolve and transition over time as the weather threat passes over. The system can also take into consideration historical climatology such as for example historical freeze lines to adjust prediction and this climatology information can also be used for EAS sensor station placement.

Utilizing the SCADA communication network available over power lines has facilitated the ability to place EAS sensors in areas that would have typically required satellite or short wave communication capability because in some areas there are no communication means. There aren't very many places in the US where there isn't electric power. This SCADA interface allows the EAS sensor stations to make an interne connection across a power line. And so that means now wherever there's a power line or some sort of electric power socket or something else like that, EAS can gain access to the SCADA communications network that runs on the power lines. SCADA is a standard protocol system control access and data analysis network. SCADA probes the entire power line infrastructure every few milliseconds. To access SCADA, an electronic conversion device is utilized to translate the SCADA protocol to that of a standard ethernet. So that means that an EAS sensor station can be placed anywhere there is an electric power line. The strategically placed EAS sensor station can monitor and communicate time, temperature, relative humidity, pressure, wind speed, wind direction, precipitation and the battery power or the charge rate due to the level of solar energy present, which tells how much sunshine. Use of an electric utility SCADA network to communicate information from the remote weather stations facilitates the ability to establish a local Mesonet network.

One embodiment of the present invention comprising a localized near term weather prediction function, a current static state environment input, a current static state infrastructure input, and a threat analysis function teaches a novel apparatus and method for a threat level index to predictor which indicates the localities which are most likely to be threatened by the exacerbation of an event by the weather, thereby equipping Emergency Response Management to then use the threat level index to determine where and when to martial personnel.

The EAS Process can use a solar powered, wireless Ethernet connected meteorological sensor suite. The solar charged battery supply is guaranteed to provide continues operation below 60 degrees latitude and will operate for at least 60 days without sun. Since there is no connection between the sensors and the power line, damage from thunderstorms is virtually eliminated and the sensors are immune to power line voltage surges. There can be wireless connectivity between the sensor station and the SCADA substation. The SCADA substations are located in areas where there are power lines. Thus the substations can be communicably connected via wireless transceivers to the EAS stations. The initial sensor calibrations for wind, temperature, relative humidity and barometric pressure are traceable to the National Institute of Standards and Technology. The passive solar shield for the temperature and humidity sensors are modeled after the ones designed by the National Weather Service. The meteorological sensor suite is capable of sampling the data every 2 seconds and transmitting data every 2 seconds. Thus the sensor suite is able to collect near real-time data. It is important to note that any wind gusts are not missed as the peaks are captured. In the current configuration, data is averaged over a one minute period before being transmitted to the central site. The averaging interval is remotely adjustable to handle different meteorological events. The sensor suite includes:

Anemometer
  Range: 0-67 meters per second
  Resolution: 1.0 unit.
    1 meter per second
    1 degree
  Accuracy: ±2% of full scale.
Temperature
  Range: −66° to +166° F.; −54° to +74° C.
  Accuracy: ±1° F.; ±0.5° C.
Relative Humidity
  Range: 0 to 100% RTY.H.
  Accuracy: ±2% at 25° C. Temperature compensated from −40° to 85° C.
Barometer
  Range: 551 to 1084 Millibars (hPa), absolute reading. Digital offset for site altitude.
  Accuracy: ±1.69 Millibars (hPa) at 25° C. Temperature compensated from −40° to 85° C.
Rainfall
  Range: Unlimited Tipping bucket with 8-inch diameter collector.
  Resolution: 0.01"; 0.25 mm.
  Accuracy: ±2% at 1 inch per hour.
Transceivers
  Range: Up to one-mile line of sight. Walls or other RF absorbing structures may reduce range.
  Frequency: 2.4 GHz spread spectrum 802.15.4. F.C.C. Approved.

Given that SCADA is a standard protocol system control access and data analysis network and that SCADA probes the entire power line infrastructure every few milliseconds, the ability for EAS stations to communicate across the SCADA network alleviates the need to invest in a huge infrastructure. The wireless transceivers at the substations can be equipped with an electronic module that take data transmissions from the local Mesonet stations and convert the transmission to a SCADA protocol format that can be transmitted across SCADA to a central location where the transmission can be converted to transmit the data via the interne to the EAS computing systems. The universal protocol of SCADA for electrical utilities across the country makes the present invention easily transportable from one region to another.

In order to insure that only correct data from the Mesonet are incorporated into the EAS process the data from the Mesonet stations is carefully examined. The data from each station is checked to insure that the values are within realistic ranges (level 1 check). The data is then compared against values for the same station for previous times (level 2 check) to insure that a single miss-transmission of data has occurred. The data is then compared with data from nearby stations to insure that several miss-transmissions or contaminated data have not occurred. In addition to the data from Mesonet, the EAS process also receives the larger scale model initialization data. The EAS process then performs the analysis of the existing weather conditions, creates the high spatial and temporal resolution forecasts, and creates the analysis and forecast graphics and web pages. A specialized computing facility is needed, and in this instance a High Performance Computing (HPC) facility can be used.

Traditionally, computer software has been written for serial computation. To solve a problem, an algorithm is constructed and implemented as a serial stream of instructions. These instructions are executed on a central processing unit on one computer. Only one instruction may execute at a time—after that instruction is finished, the next is executed. Parallel computing, on the other hand, uses multiple processing elements simultaneously to solve a problem. This is accomplished by breaking the problem into independent parts so that each processing element can execute its part of the algorithm simultaneously with the others. The processing elements can be diverse and include resources such as a single computer with multiple processors, several networked computers, specialized hardware, or any combination of the above.

The single-instruction-single-data (SISD) classification is equivalent to an entirely sequential program. The single-instruction-multiple-data (SIMD) classification is analogous to doing the same operation repeatedly over a large data set. This is commonly done in signal processing applications. Multiple-instruction-single-data (MISD) is a rarely used classification. Multiple-instruction-multiple-data (MIMD) programs are by far the most common type of parallel programs. Parallel computers can be roughly classified according to the level at which the hardware supports parallelism. This classification is broadly analogous to the distance between basic computing nodes. These are not mutually exclusive; for example, clusters of symmetric multiprocessors are relatively common. A cluster is a group of loosely coupled computers that work together closely, so that in some respects they can be regarded as a single computer. Clusters are composed of multiple stand-alone machines connected by a network. While machines in a cluster do not have to be symmetric, load balancing is more difficult if they are not. The most common type of cluster is the Beowulf cluster, which is a cluster implemented on multiple identical commercial off-the-shelf computers connected with a TCP/IP Ethernet local area network.

The HPC facility makes use of Message Passing Interface (MPI) standard to decompose a program that is to be run on a cluster into segments that can be safely run on individual nodes of the cluster. The primary or master node that initiates the process passes a segment to the individual nodes in the cluster via the MPI software. Once each node has completed its segment, it passes the information back to master node again via the MPI software. The EAS process currently uses COTS computers from Sun Microsystems running the Solaris operating system. The use of clustered COTS computers allows the creation of a HPC facility at minimal cost.

Connecting together the individual weather stations would traditionally require a dedicated Ethernet or a radio to transmit the data from the weather station to the central facility. The dedicated Ethernet connection has proven to be too expensive to use in an ongoing basis and is only in use for special short-term projects. Although the radio based links are possible their limited bandwidth prevent rapid transmission of data from the remote site to the central facility. Working in cooperation with the electric power industry, the data from the remote stations are connected to the power industry's Supervisory Control And Data Acquisition (SCADA) network. The SCADA network makes use of the power lines to monitor and control the electric power grid, monitor and read electric power meters and notify the power company of anomalous conditions. This high bandwidth connection allows the weather data to be piggy-backed onto the existing data stream. This allows the weather stations to be monitored continuously. Since the electric power industry has facilities located throughout any region the networked weather station can be placed anywhere the electric power industry or any other group making use of the SCADA network is located, including water treatment and distribution, wastewater collection and treatment oil and gas pipelines, and large communication systems.

Figure 2:
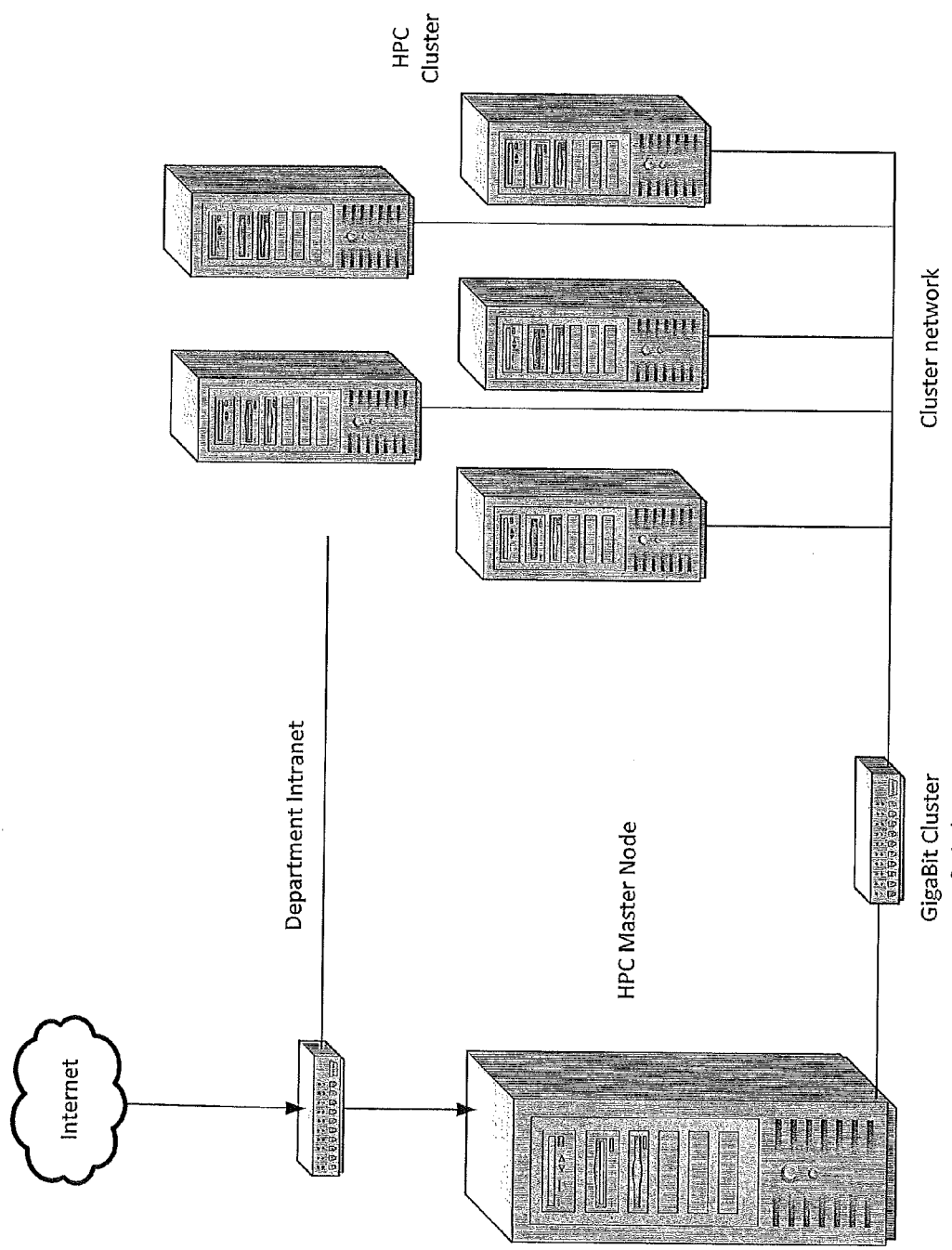
FIG. 2 is a functional illustration of EAS.

The details of the invention and various embodiments can be better understood by referring to the figures of the drawing. Referring to FIGS. 1 and 2, an illustration of one embodiment of an EAS environment is provided. As previously discussed the sensor arrays can be remotely located strategically based on regional characteristics, maximizing spatial and temporal resolution and the specific application, for example an electrical utility. The sensor array includes an anemometer, a temperature sensor, a humidity sensor, barometer, a rainfall detector and a wireless transceiver. The sensor array must be place atop an electrical pole, tower or other high structure that allows for mounting of the sensor array such that the sensing is unobstructed. The sensor array can be solar powered, battery powered or powered by a proximate electrical line. A battery power source can be rechargeable that is recharged by a hardwired electrical source or by solar power.

The transceiver can transmit the sensed data wirelessly to a substation that can buffer the data and transmit the data via an Ethernet interface to a SCADA network. For example in the utility industry, SCADA networks are often already in place to monitor the operation of the infrastructure, for example the operation of a substation or a transformer. An existing SCADA network will have a data protocol whether the protocol is proprietary or a standard protocol. Therefore a converter for converting the sensor data to a protocol or format of a SCADA network may be necessary. A converter or concentrator can be installed at the input of the SCADA system for converting the sensor data. Once the sensor data is converted, it can be sent to a SCADA server which can process the data for transmission to a central location where the data can be evaluated. The information can be transmitted by the SCADA server over a wide area network, for example the Internet, to a EAS system. The EAS system can receive the information sent over a wide area network through a proxy server, which can transmit the information to a EAS master node server. The EAS master node server can decompose and parse the data for further processing by the multi-core client node servers.

Placement of a sensor station for the local mesonet can be determined by considering three primary parameters and they are—1.) the type of weather threat/event of concern; 2.) the type and location of the asset that is potentially threatened; 3.) extraneous unique local conditions that may render an otherwise predictable environment unpredictable or magnify the threat level of the weather threat/event even when the weather threat/event would have normally been a non-event. Item 1.), though considered, can be rendered of little or no effect if each sensor station placed has the entire suite of sensor types and the sensor station is optimally placed such that each sensor type will get a good reading. The stations also can have the ability to sample in the vertical. However, placement of a station for optimal reading of all sensor types will be overridden if the asset of concern is most threatened by a particular type of weather threat/event such that placement is skewed toward a placement that provides best sensing capability for that particular type of weather threat/event that the asset is most endangered by. For example, a power line may be most threatened by icing or high winds. Therefore, the most heavily weighted parameter can likely be the type and location of the asset that is potentially threatened. Placement of sensor stations are made to provide the best coverage for the assets of concern and placement of stations are skewed toward a placement that allows for best sensing of a weather threat/event of most concern. Item three can be natural or man made obstructions or objects or climatologically induced conditions that hinder normal predictive capabilities or that can increase the threat level above what it would otherwise normally be. For example, a building may hinder an accurate reading of wind conditions. Traditional placement of sensor stations have typically resulted in placement of sensor station in and around major airports because of there typical proximate to large metropolitan areas. If it is decided to install an EAS system in an region, then sensor stations can be installed strategically at various locations as dictated by the above parameters in order to form a local mesonet network, which provides coverage for the assets of concern in the region. The local mesonet can be implemented and layered in combination with other available data as discussed above.

Figure 3:
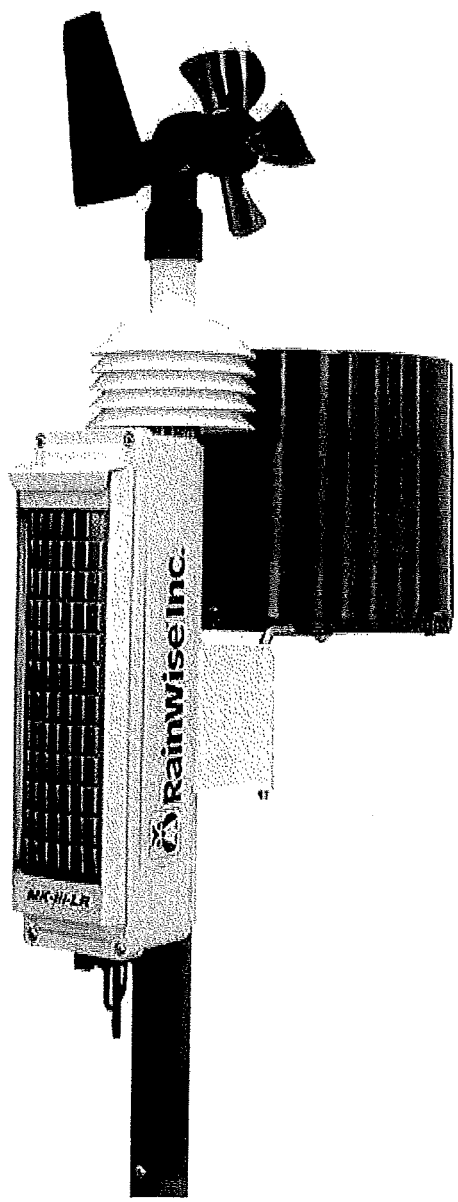
FIG. 3 is a functional illustration of a sensor suite.

Referring to FIG. 3 an illustration of a representative sensor suite is provided. The sensor suite can include an Anemometer sensor having a range of about approximately 0-67 meters per second and can have a resolution of 1.0 unit, 1 meter per second, 1 degree with an accuracy of ±2% of full scale. The sensor suite can have a temperature sensor having a range of about approximately −66° to +166° F. (−54° to +74° C.) with an accuracy of about approximately ±1° F. (±0.5° C.). The suite can include a sensor to detect relative humidity having a range of about approximately 0 to 100% RH with an accuracy of about approximately ±2% at 25° C. and with a temperature compensated from about approximately −40° to 85° C. The suite can include a barometer having a range of about approximately 551 to 1084 Millibars (hPa), with an absolute reading, a digital offset for site altitude and an accuracy: ±1.69 Millibars (hPa) at 25° C. and temperature compensated from −40° to 85° C. The suite can include a rainfall detector having an unlimited tipping bucket with 8-inch diameter collector with a resolution of about approximately 0.01" (0.25 mm), and an accuracy of about approximately ±2% at 1 inch per hour. The suite can include wireless transceivers having a range of up to one-mile line of sight with a frequency of 2.4 GHz spread spectrum 802.15.4. F.C.C.

Figure 4:
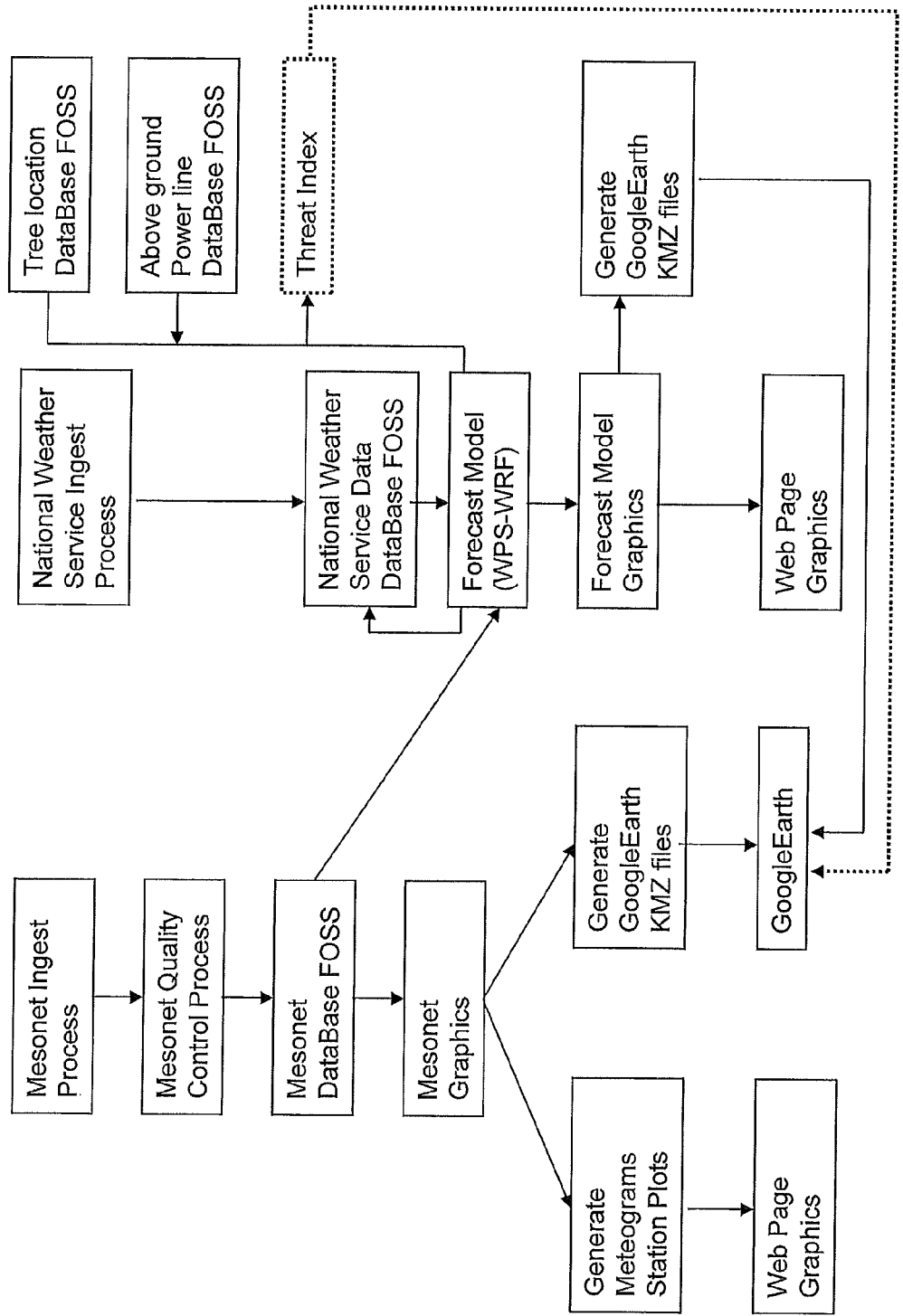
FIG. 4 is an over functional flow of the EAS process.

Referring to FIG. 4, an illustration of an EAS operational flow is provided. The operational flow has three primary functional flows. The EAS process begins with ingest of data from two different data streams. The first data stream is the observations and global model forecast data. The second data stream is the observations from the EAS process Mesonet. The data stream from the National Oceanic and Atmospheric Administration consists of observations of the three-dimensional structure of the atmosphere and large-scale forecasts from numerical weather prediction model run by the National Weather Service. However, not only are the stations from the National Weather Service irregularly spaced, they are also not strategically space for the local mesonet. Therefore, EAS transforms the information in an objective fashion onto the individual grids. There is an objective analysis method that is used to perform this function. There is a method that is utilized by the EAS system that can generally be referred to as the ObsGRID function that transforms all of the information from an irregularly spaced network of stations and imports the information on uniform cubical grids in a fashion that is sufficiently accurate for the necessary predictions. A Nyquist sampling technique can be utilized, which can be used along with a Barnes and/or Cressman sampling technique. This transformation is necessary for the ingest process. From these functional flows a threat index can be developed.

There is also a user interface flow. The user interface flow allows the user to intercede and modify the operation of the EAS process. For example a user through the user interface can modify or eliminate faulty input data or forecasts and fine-tune the threat index. Also the user can input through the user interface additional parameterized information such as the content of a chemical involved in a chemical spill. The user may also make modifications due to known climatologically induced conditions that may have an effect on prediction capability and parameterization schemes.

In order to insure that only correct data from the Mesonet are incorporated into the EAS process, data from the Mesonet stations is carefully examined. The data from each station is checked to insure that the values are within realistic ranges (level 1 check). The data is then compared against values for the same station for previous times (level 2 check) to insure that a single miss-transmission of data has not occurred. The data is then compared with data from nearby stations to insure that several miss-transmissions or contaminated data have not occurred. The Mesonet ingest function then stores the data from the Mesonet into a database for later retrieval by other parts of the EAS process.

The National Weather Ingest function imports observations and global scale numerical weather forecasts from the National Oceanographic an Atmospheric Administration and stores the information in a database for formulation of the forecast model.

The EAS process also utilizes various databases containing information related to the natural environment such as terrain, land use, soil moisture, soil temperature and trees to create the high spatial and temporal resolution weather forecast. The EAS process also utilizes various databases containing information related to infrastructure and critical facilities such as overhead power lines, electrical utility substations, schools and hospitals. The combination of the high spatial and temporal resolution forecast and the various databases relating to infrastructure and critical facilities gives the EAS process the ability to create threat indicators that can assist logistical managers within the utility industry, emergency response industry, or other government agencies in the allocation of resources and manpower. The localized weather prediction having maximized temporal and spatial resolution combined with other information can allow for example a utility industry logistical manager to allocate resources in localized areas where icing is forecasted and trees are located adjacent power lines. The high resolution from the Mesonet combined with weather prediction models (WRF), allows for the prediction models to be more effectively tuned, due to the local maximized spatial and temporal data provided by the Mesonet, to fit the local conditions.

This is accomplished by choosing from the many possible choices of parameterization schemes based on the Mesonet data where those parameterizations schemes are such that when they are combined with WRF can provide the best possible localized forecast. The present invention determines which combinations of parameterization schemes produce the highest spatial and temporal correlation factors for the application, for maximizing spatial and temporal resolution and for the region. This is accomplished by utilizing the forecasted weather conditions and observed weather conditions from the real time localized sensors of the Mesonet. Possible available parameterization scheme options are reflected in Appendix 1 and a representative determined scheme is reflected in Appendix 2. Weather forecast maps, graphics and threat indexes can be produced and provided to a logistical manager for allocating resources and manpower.

EAS can also provide a threat index for an event that is designed to identify problem areas of interest that merits action or a closer watch. The threat index level can be determined by considering a combination of three factors including 1.) the type of asset; 2.) weather conditions that can potentially place the asset at risk; and 3.) special conditions in the area that can potentially amplify the threat. In the case of an electrical utility, the asset could be power lines or high tension towers. The weather conditions could be icing or high winds. The special conditions could be trees hanging over the power lines. The threat index could be a level rating of 0 to 100 where 100 is the highest threat level. EAS determines at what geographic locations and what predicted times will all three of those conditions exist and attach to that a number.

Given a high spatial and temporal resolution meteorological forecast is made, the system combines the weather predictions with infrastructure data and/or natural environment data of the area to create a threat level index and a graphical map presentation of any threats. As will be understood by one skilled in the art, certain weather conditions combined with certain types of infrastructure can create emergency conditions. The threat level index is a probabilistic tool that rates areas in which certain infrastructure is likely to encounter certain, possibly hazardous conditions, and/or outages, which can result in a high probability of danger and/or service outage periods.

For example, in one embodiment of the present invention, the predictive indicator system provides a threat level index for a weather event to an municipal electric utility company. Infrastructure data including the location of above-ground power lines and trees can be infrastructure and natural inputs into the system. The system can then analyze the likelihood that winds over a certain speed will occur and/or that icing will occur in an area where both above-ground power lines and trees are present. Where it is determined that all three of these factors are likely to overlap, a high threat level is assigned. Thus, an Emergency Management Center of an electric company can be notified and therefore, be able to decide where and when to martial manpower before the crisis or outage arises.

Figure 5:
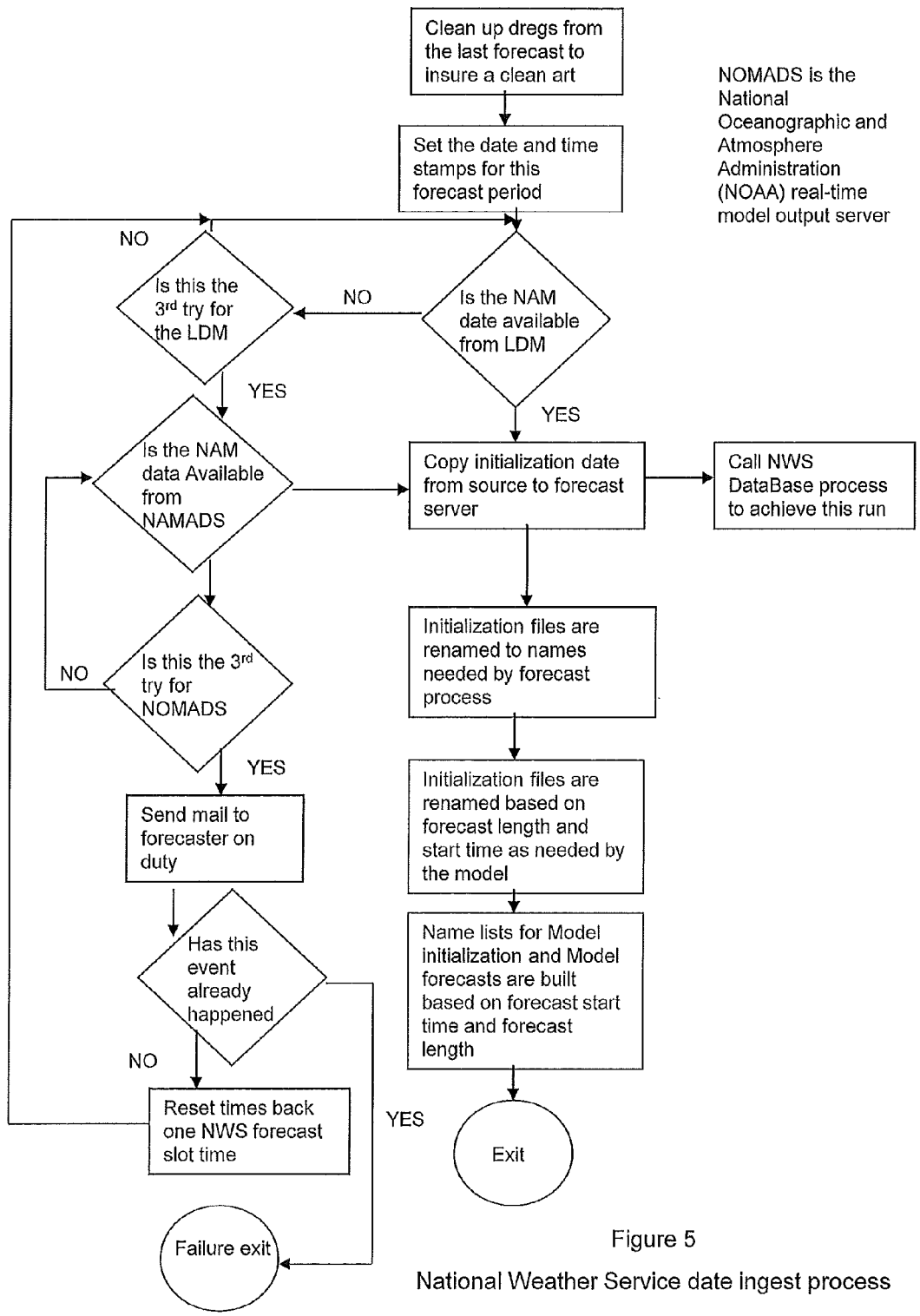
FIG. 5 is a functional flow of the National Weather Service Data Ingest Process.

Referring to FIG. 5, an illustration of the NWS data ingest process is provided. The National Weather Service (NWS) ingest process is designed to obtain the necessary observations and global-scale numerical weather forecasts from the National Weather Service. The NWS ingest process begins by removing any files from previous runs of the NWS ingest process and determining the date and time of the data to be ingested. The NWS ingest process then attempts to obtain the necessary global model forecast data to initialize the local model. The NWS ingest process makes threes attempts to obtain the global model forecast data from the local source of NWS data (the Local Data Manager: LDM in FIG. 5). If three unsuccessful attempts are made to obtain the global models forecast data locally, the NWS ingest process sends mail to the forecaster on duty notifying them and the failure and then makes three attempts to obtain the global model data directly from the National Weather Service servers. If this fails the NWS ingest process again notifies the forecaster on duty and resets the date and time to obtain an earlier run of the global model forecasts data. If this process fails once the NWS process exits and notifies all forecasters of the failure. Given the global model forecast data the NWS ingest process creates the necessary Mesoscale model boundary conditions naming the files with the date and time of the initializations. The global model forecast data, boundary conditions and files with the correct parameterization schemes are passed to the Mesoscale forecast model and to a database where the information is stored for other processes. Parameterization schemes are typically region and application dependent—the correct parameterization schemes for a region in the Midwest, such as for example Missouri, would be different from a coastal region, such as for example California, due to the different general weather conditions experienced in such disparate regions.

Figure 6:
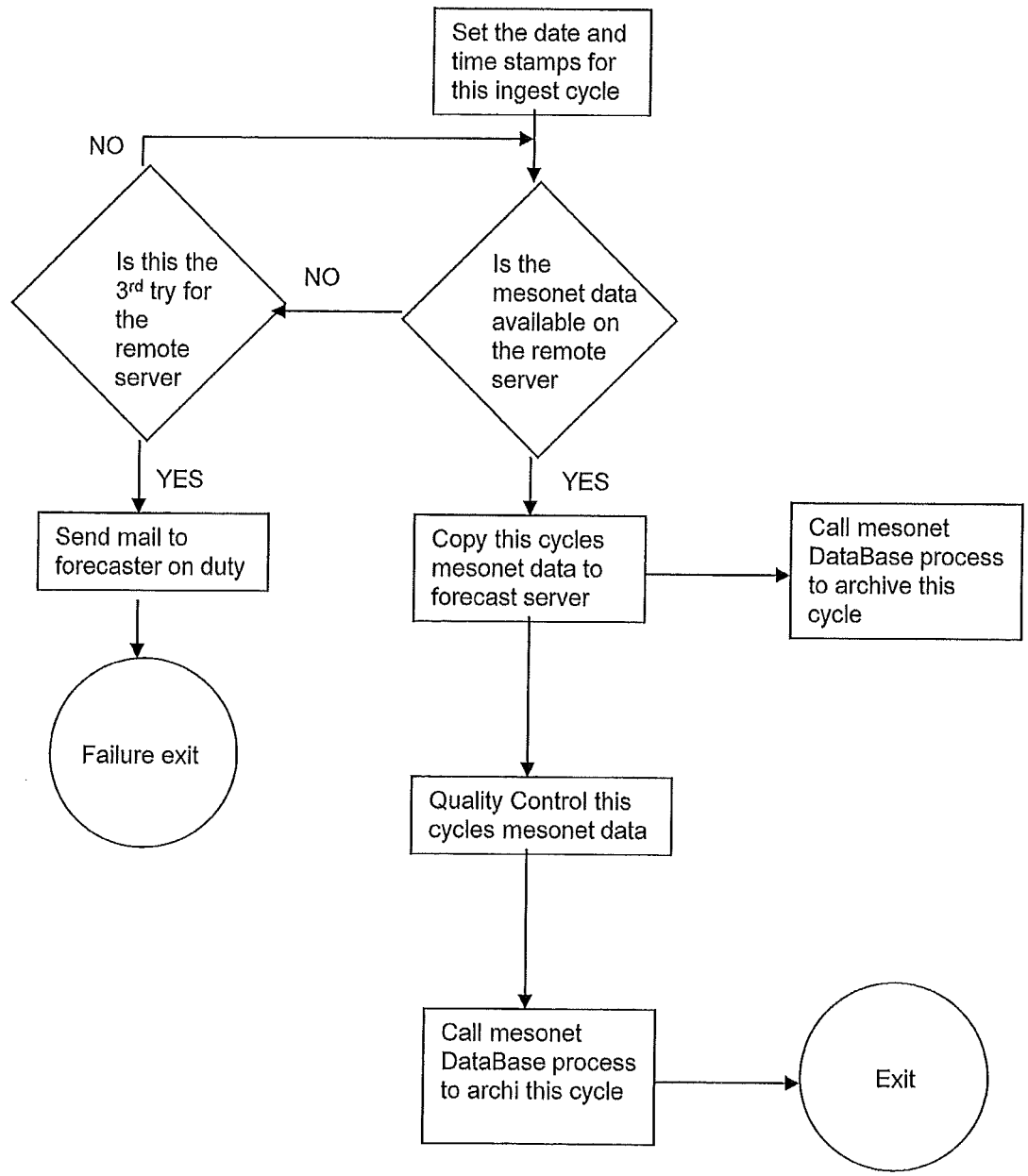
FIG. 6 is a functional flow of the Mesonet Data Ingest Process.

Referring to FIG. 6, a functional flow of the Mesonet Data Ingest Process is illustrated. As noted in paragraphs 40 and 41 above the data from each of the sensor arrays are strategically placed based on regional characteristics to maximize the spatial and temporal resolution for the specific application. Further these sensor arrays are can be connected to a commonly used utility industry network called SCADA. Other networks can be utilized without departing from the scope of the present Invention. Thus the data from the SCADA network is first collected at a SCADA central site where the data from all the sensors are collected and sorted by time. The collected and sorted data from the sensors are then forwarded to EAS process central site. At user selectable intervals the Mesonet ingest process contacts the SCADA central site to determine what data is available. If the requested data is available it transferred from the SCADA central site to the EAS process central site. If not, then three attempts are made to request the data from the SCADA central site. If after three attempts the requested data is not available email is sent to the forecaster on duty warning of the failure. If the data is available, the raw Mesonet data is stored in a database and the Mesonet quality control program is forked from the Mesonet ingest process. Once the Mesonet quality control program returns the quality controlled data and the quality control flags are stored as a second entry in the Mesonet data database for each date time stamp and station. Each ingest cycle is assigned a date and time stamp so that near real time data can be utilized along with the most recent trends and transitions.

Referring to FIG. 7a, a functional flow of the Mesonet Quality Control Process is provided. As with other components of the EAS process, the Mesonet quality control process begins by obtaining the date and time of the Mesonet data that is to be quality controlled. The data from a SCADA central site can optionally not have important information, such as information regarding the latitude, longitude and height above sea level of a sensor, attached to the data transmitted from the sensor in order to minimize the amount of information transmitted from each sensor package. In that case, the data from a sensor station preferably contains the "name" of the sensor station and the weather data recorded by that sensor, allowing the EAS system to then determine the omitted information from a lookup table of sensor station names correlated with such latitude, longitude and height above sea level data. Once a match is found the data record has the appropriate information attached.

Figure 7:
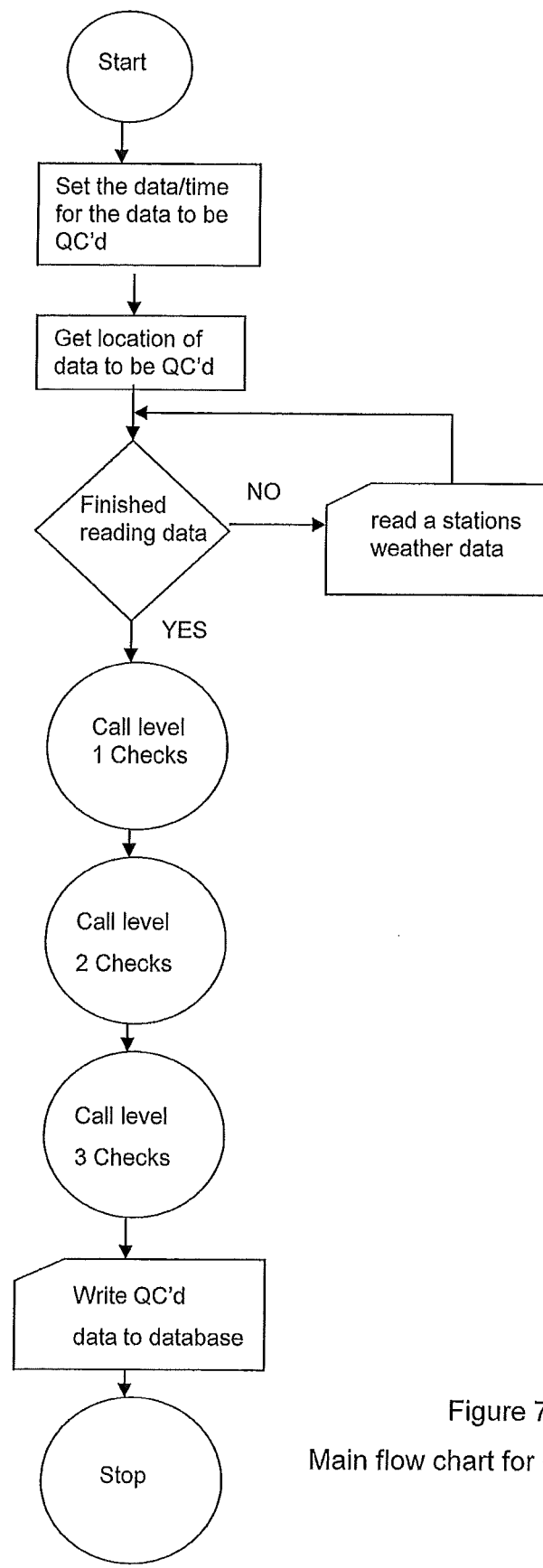
FIGS. 7-7d is a functional flow of the Mesonet Quality Control Process
Figure 7B:
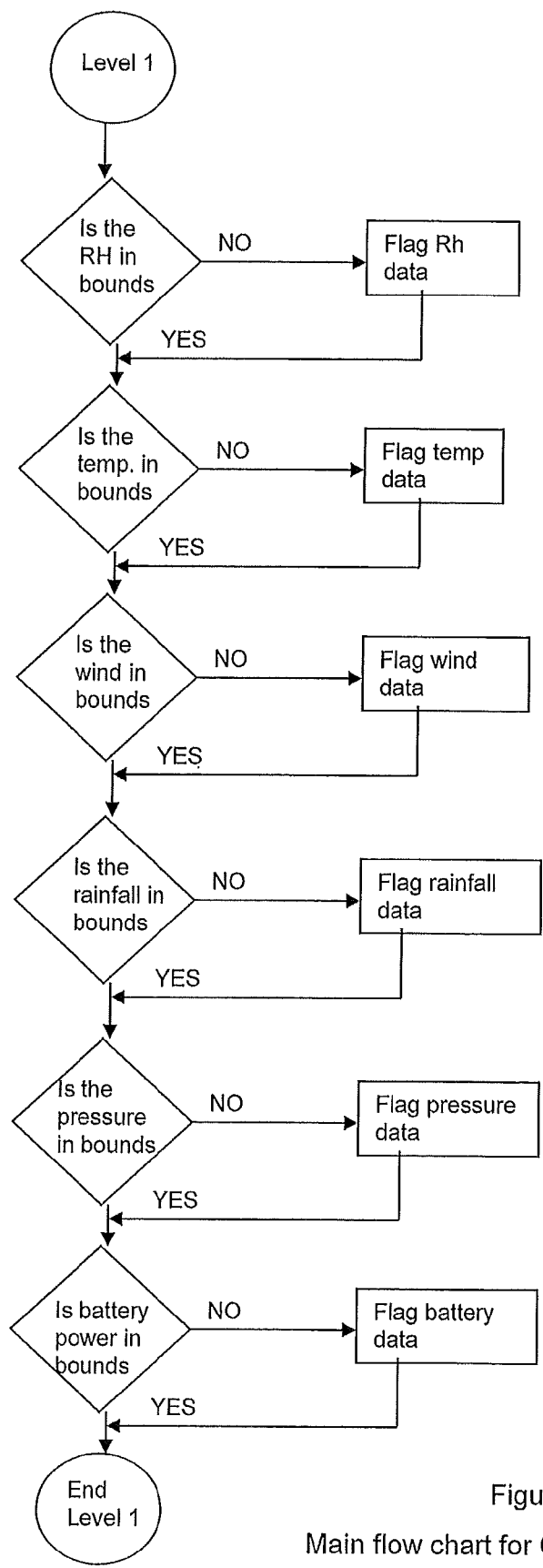

Referring to FIG. 7b, the first step in the Mesonet quality control process is to check the data from each station to insure that the values are within realistic ranges. This is referred to in FIG. 7a as a level 1 check. The ranges of realistic values are based on both the season and typical values suggested by the National Weather Service. Values that are out of bounds are flagged as bad data by setting the flag to the amount the value was above or below the acceptable ranges.

Figure 7C:
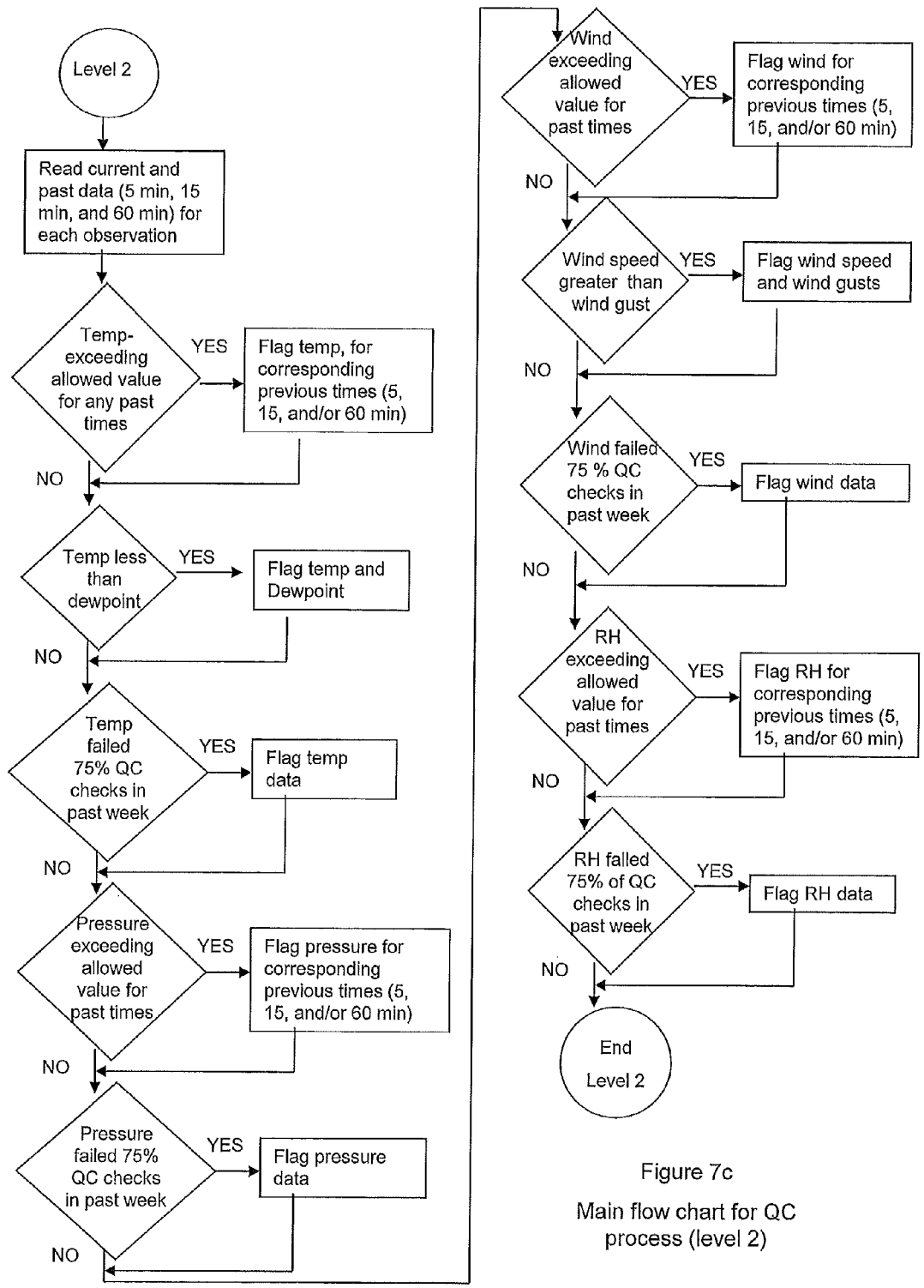

Referring to FIG. 7c, the next step in the Mesonet Quality control process is a check for temporal continuity. If this station's data has failed a level 1 check, then a level 2 check of this station's data is not conducted. In order to conduct a temporal continuity check, the data from each station is compared to values for the same station in 1 minute, 5 minute, 15 minute and 60 minute increments in the past to insure that a single miss-transmission of data has not occurred. This is referred to as a level 2 quality control check in FIG. 7a. As with a level 1 check, if bad data is determined, it is flagged by setting the bad data flag to the amount of error found in the data.

Figure 7D:
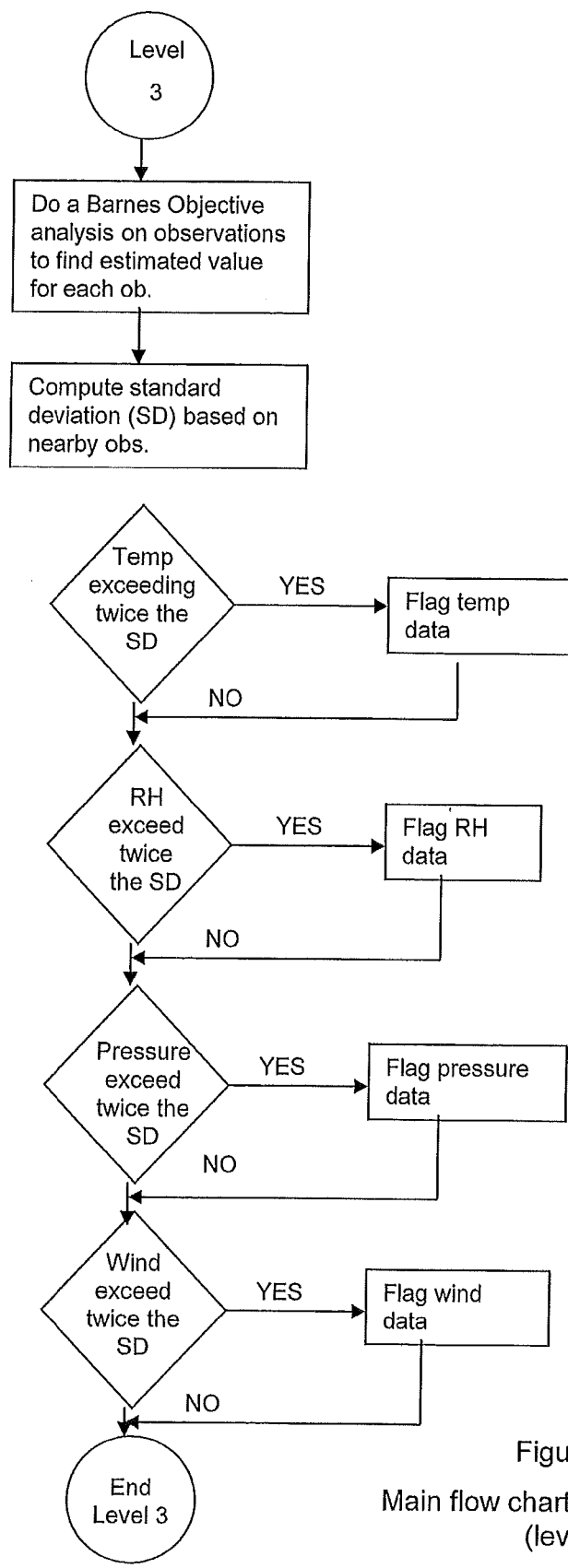

Referring to FIG. 7d, the next step in the Mesonet quality control process is to test a station's data is representative. In this case each stations data is compared to its neighbors' to determine a stations data is significantly different than near by stations. If this stations data has failed a level 2 check, a level 3 check of this stations data is not conducted. This check is performed by removing each station in turn from the list of stations reporting. A Barnes objective analysis is then computed with the restricted data set. A bi-linear interpolation of the gridded data to the location of the station removed and the values from the interpolation is compared to the actual data at the station. If the station is truly representative of the weather there will only be a small difference between the interpolated data and the actual data. This is referred to as a level 3 check. As with the level 1 and level 2 checks any stations with errors are flagged with the amount of error found in the stations data.

Figure 8:
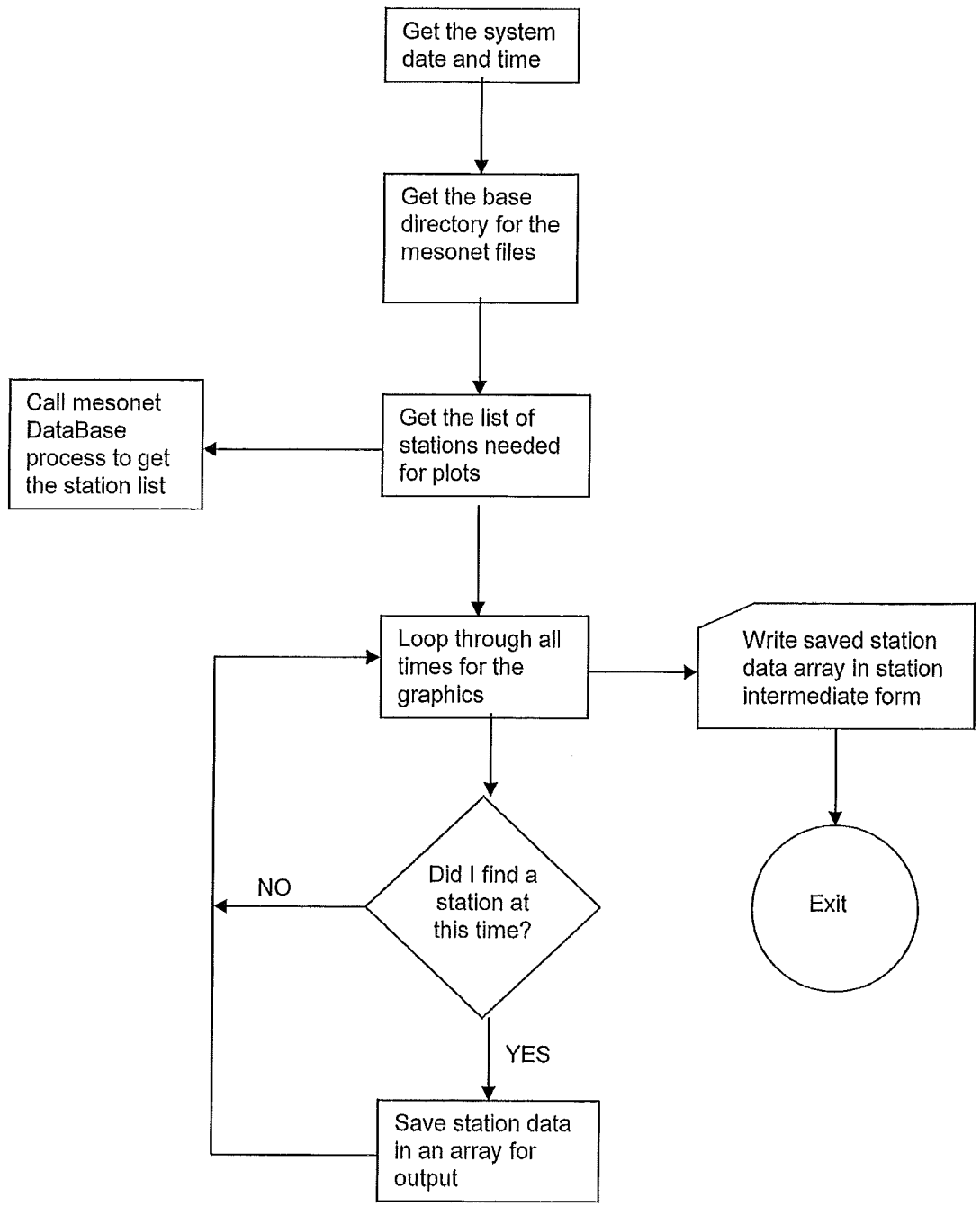
FIG. 8 is a functional flow of the Mesonet Graphics preprocessor.

Referring to FIG. 8, a functional flow of the Mesonet Graphics pre-processor is provided. The advantage that the Mesonet data provides is the monitoring of the weather conditions at locations spaced closer together than prior art monitoring stations. The greater number of sensors spread over a smaller area provides a higher spatial and temporal resolution of the existing weather and allows the Mesoscale model to start with a more accurate set of boundary conditions. So part of the solution provided by EAS to the question of how big the domain is and how to place stations is very dependent on the particular problem that is trying to be solved. It is a time problem in the sense of how much is needed. It is also a spatial problem because EAS must determine how much spatial coverage is needed or how far to go back to get enough upwind or upstream data. So, the placement of the sensor stations for EAS is dependent in space and time on how much lead time is needed. There is a spatial and temporal resolution. The location of assets of concern is also a driver for placement of the sensor stations. Further, unique natural or land-use or infrastructure conditions can be a driver as well as known prediction problems. EAS has an optimization scheme to address the various needs. However, an increase in the number of sensor stations forming a local mesonet is not all that EAS provides. The EAS system's strategic placement of sensor stations is also provided.

Strategic placement of a sensor station for the local mesonet can be determined by considering three primary parameters and they are—1.) the type of weather threat/event of concern; 2.) the type and location of the asset that is potentially threatened; 3.) extraneous unique local conditions that may render an otherwise predictable environment unpredictable or magnify the threat level of the weather threat/event even when the weather threat/event would have normally been a non-event. Item 1.), though considered, can be rendered of little or no effect if each sensor station placed has the entire suite of sensor types and the sensor station is optimally placed such that each sensor type will get a good reading. The stations also can have the ability to sample in the vertical. However, placement of a station for optimal reading of all sensor types will be overridden if the asset of concern is most threatened by a particular type of weather threat/event such that placement is skewed toward a placement that provides best sensing capability for that particular type of weather threat/event that the asset is most endangered by.

For example, a power line may be most threatened by icing or high winds. Therefore, the most heavily weighted parameter can likely be the type and location of the asset that is potentially threatened. Placement of sensor stations are made to provide the best coverage for the assets of concern and placement of stations are skewed toward a placement that allows for best sensing of a weather threat/event of most concern. Item three can be natural or man made obstructions or objects or climatologically induced conditions that hinder normal predictive capabilities or that can increase the threat level above what it would otherwise normally be. For example, a building may hinder an accurate reading of wind conditions. Traditional placement of sensor stations have typically resulted in placement of sensor station in and around major airports because of there typical proximate to large metropolitan areas. If it is decided to install an EAS system in an region, then sensor stations can be installed strategically at various locations as dictated by the above parameters in order to form a local mesonet network, which provides coverage for the assets of concern in the region. The local mesonet can be implemented and layered in combination with other available data as discussed above.

There also may be areas of interest were EAS has determined an effective parameterization scheme in a particular region is not feasible thus actual data is needed thus driving the placement of sensor stations in the local mesonet. EAS is designed with locations to fill in gaps where information is needed to have an answer to or description of conditions so that EAS can report what is actually happening on a regular basis based on what is seen across the network in terms of how much longer, for example the icing event, is going to continue and how heavy the icing was going to be and how fast is it accumulating. The EAS system also allows for user input to make adjustments just based on user knowledge of current conditions or historical knowledge. Thus a user can alter the boundary layer parameterization scheme. There's a different choice for that particular combination. And so there's a list of these, all of these combinations that we, you know, have, there's this great big table that says if this is happening, then go pick this particular set of parameterization schemes.

To best assess the existing weather conditions, all of the meteorological parameters need to be seen in context, both spatially and temporally. The Mesonet graphics pre-process places the Mesonet data requested into the formats needed by the Mesonet graphics tools. The Mesonet data is presented in one of two major forms: The first is in the form of standard meteorological diagrams such as meteograms and station models for web based graphics. The second form is standard GoogleEarth™ KMZ files. The Mesonet graphics pre-processor sorts the Mesonet data by date, time and station to create of list Mesonet station data to be plotted. Once the list of stations is created the Mesonet data is written out in an intermediate form that is readable by both standard web-based graphics and GoogleEarth™.

Figure 9A:
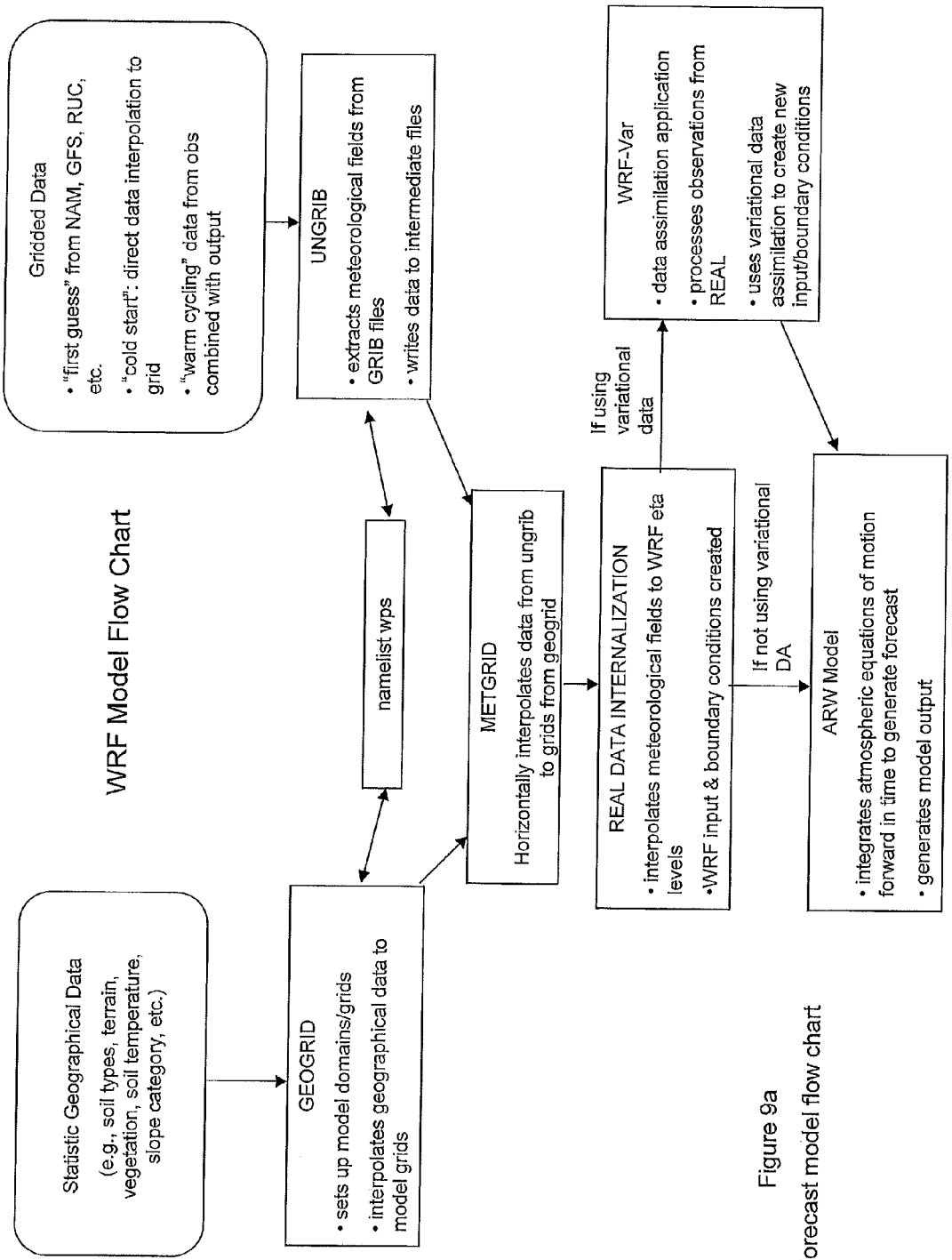
FIG. 9a is a functional flow of the Forecast Model.

Referring to FIG. 9a, a functional flow of the Forecast Model is provided. In order for the Mesoscale meteorological model to create the high spatial and temporal resolution forecasts several independent data sets need to be combined in order to create the lower and lateral boundary conditions for the Mesoscale model. Some of these data sets can be referred to as static data as they change only slowly. An example of a static data set is the topography of the region over which the Mesoscale model is to be run. A second example of a slowly varying but static (for the purposes of the Mesoscale model) data set is the vegetation and land use data. These data are organized by latitude and longitude and available from a number of sources on latitudinal grids that do not match the grid used in the Mesoscale model.

In order to make use of this static data on the grids, the model needs to be a WRF model that allows placement of the static geographic data on a compatible grid of the WRF model by using the geogrid process in order to convert for internal Mesonet model grid values. This creates an intermediate format file that is used by other processes in the Mesoscale model. At the same time the lateral boundary conditions needed by the model to allow for weather systems to pass across the Mesoscale model are provided by the global scale forecasts from the National Weather Service. This data is transmitted in a compressed binary form that needs to be unpacked before it can be used. The WRF model uses the UnGRIB process to unpack the binary formatted data into an intermediate form that can be used with the Mesoscale model. As with the static data the global scale forecast data are not on the same grid as that of the Mesoscale model. To convert the global scale forecast data into the boundary conditions needed by the Mesoscale model, the WRF process MetGRID combines the static geographic data and the global forecast data into a single data set on the grid required by the Mesoscale model. At this point all the data needed by the Mesoscale model is on a consistent grid but is not dynamically and kinematicaly consistent. In order to render this new data set consistent, the WRF process real is executed to insure that all the dynamical and kinematic constraints are enforced. Given the dynamically and kinematically constrained data the Mesoscale model is run to create the high spatial and temporal resolution forecasts needed.

The Mesoscale prediction model that generates high-resolution meteorological fields, which allows for localized Forecast fields, which can be combined with application specific geospatial data on client infrastructure land use and other data. Threat index maps can be generated by application specific combination of meteorological and other data. Mesoscale observation network can be achieved by remotely located sensor suites that can be Commercial of the shelf sensor package with wireless communication and solar charged batteries or a customized suites. A Pre-existing digital broadband communication network, such as a SCADA network, can be leveraged. The system can provide a localized High spatial and temporal resolution customized to a specific application that has Near real-time quality control and ingest of Mesoscale observed data. This data can be utilized in combination with the FOSS Mesoscale prediction model with the FOSS Mesoscale model optimized for best forecast performance.

Figure 9B:
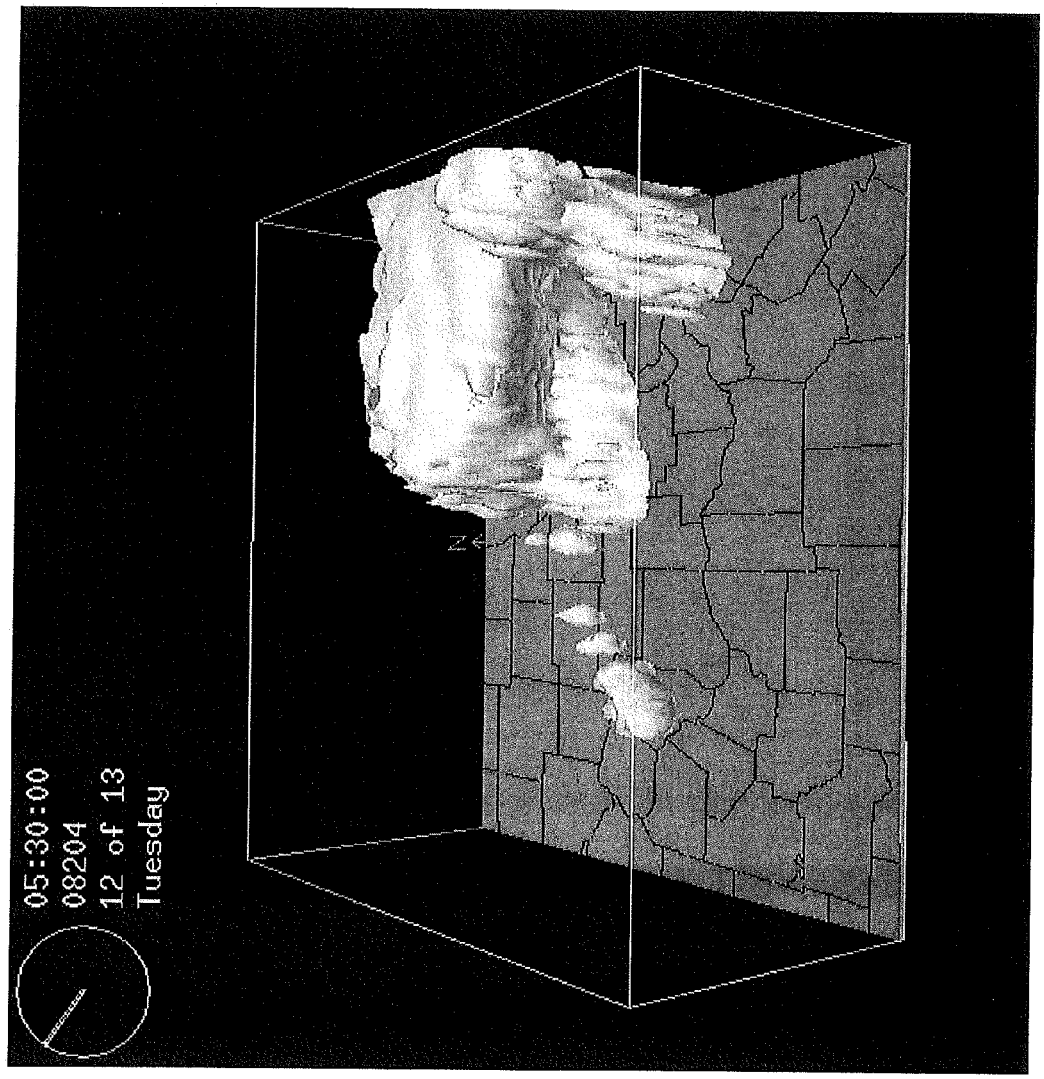
FIG. 9b is an illustration of a three-dimensional rendering of forecast data.

Referring to FIG. 9b, an illustration of a three-dimensional rendering of forecast data is provided.

Figure 9C:
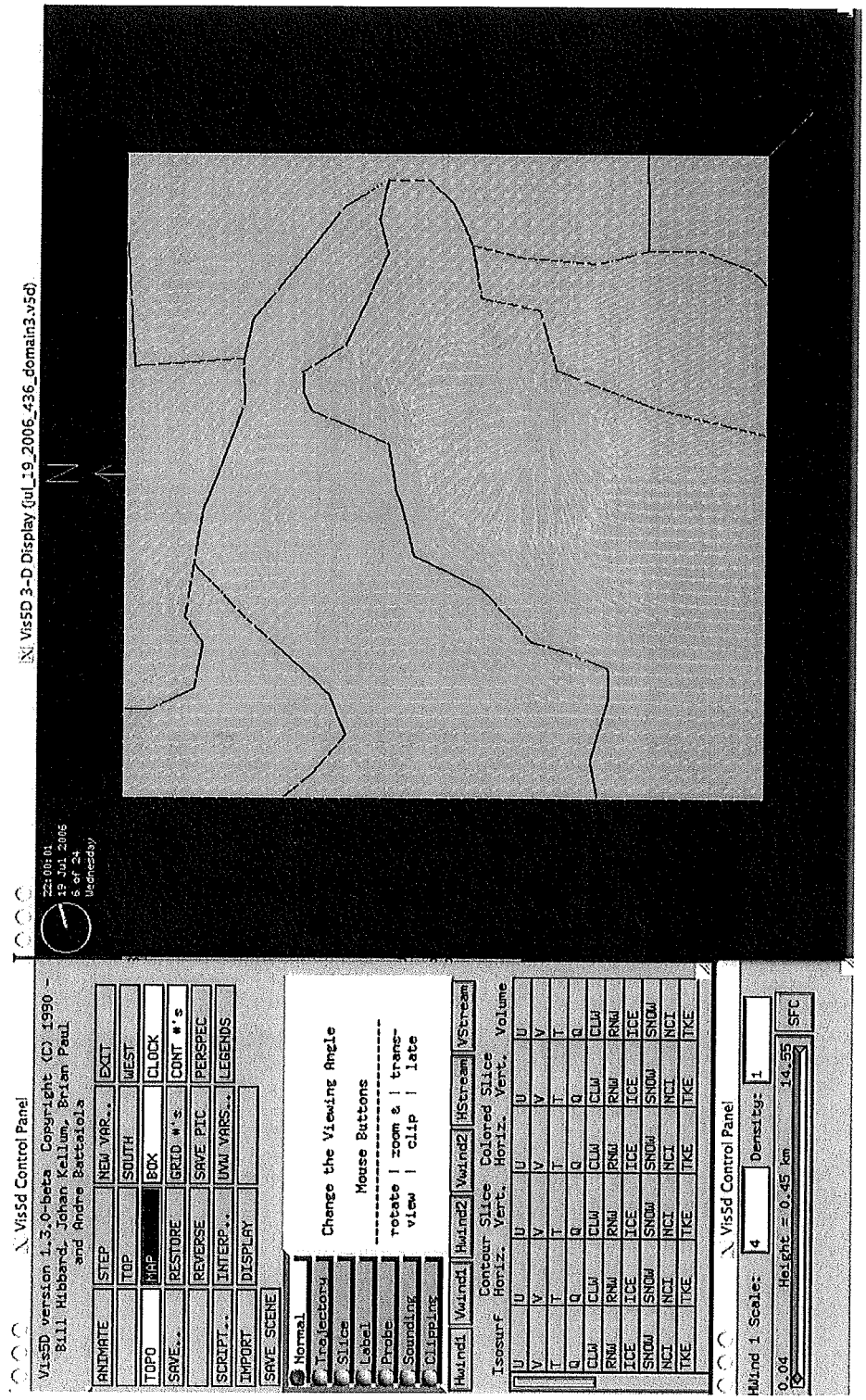
FIG. 9c is an illustration of forecast data.

Referring to FIG. 9c, an illustration of forecast data is provided. In this illustration, wind vectors can be seen, which relate wind direction and intensity across a region. The length, direction and placement of the arrows define the speed and direction of the wind at specific positions. When combined, the wind vectors comprise a wind gradient. Very high wind speeds can be flagged as possible threat.

Figure 9D:
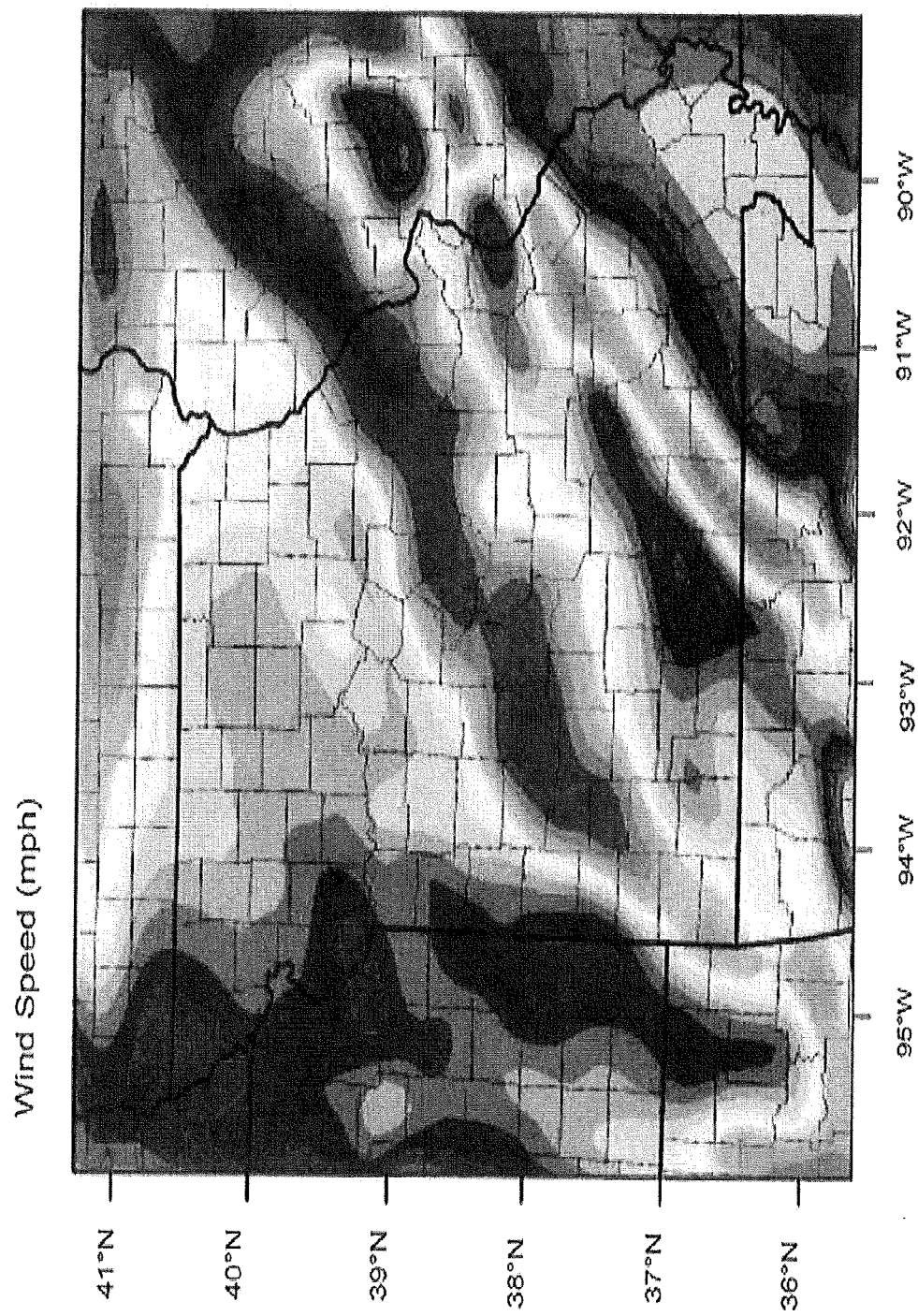
FIG. 9d is an illustration of threat level data; and While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

Referring to FIG. 9d, an illustration of threat level data is provided. In this illustration, threat levels are shown across the state of Missouri, with the highest threat levels being located in the southeastern corner of the state. Such an output from the EAS system could be analyzed by a forecaster, or be given to the Emergency Response Management of a business or the government for their review. Based on such an illustration, such management could determine how to response to the impending threat.

The EAS process as described above is an automated system with oversight by an experienced weather forecaster who can at their discretion alter the flow of the process via a user interface. This allows the EAS process to more faithfully determine the threat posed by a weather event and to allow the EAS process to handle unexpected events such as a hazardous chemical spill. Every day a new Lead Forecaster can take over at 12UTC. At this point the lead forecaster verifies that the Mesonet data and network are operating normally by monitoring the status provided by the user interface. Further the lead forecaster examines the log files created by the previous lead forecaster for notes on the performance of the system during the previous shift. To further verify the performance of the EAS process, the Mesonet Quality control run logs and model run logs are examined to insure that no unexpected results have been produced. At this point the lead forecaster reaches a decision point for the EAS process.

The data from the National Center for Environmental Prediction has become available and the lead forecaster can make a decision as to which configuration of the Mesoscale model to run. If the lead forecaster does not believe a significant weather event will occur in the next twenty-four hours or if the scale of the significant event can be accurately forecast by a slightly lower resolution, a high spatial and temporal resolution (9 km grid spacing) version of the Mesoscale model is selected via the user interface and run by allowing the EAS process automated software to run to completion. If on the other hand in the opinion of the lead forecaster a significant weather event will occur in the next twenty-four hours a very high spatial and temporal resolution (1 km grid spacing) version of the Mesoscale model can be selected via the user interface and run by restarting the EAS process with a the high resolution flag set. Further the lead forecaster can make the decision as to whether to run multiple realizations of the Mesoscale model utilizing different starting and boundary conditions in order to create the most accurate assessment of the significant weather event. By rerunning the model with varying starting and boundary conditions, the lead forecaster can analyze the variance in the prediction outcomes and determine a confidence level in the assessment of the weather.

In the event the lead forecaster decides that a significant weather event will occur in the next twenty-four hours requiring the very high resolution version of the Mesoscale model to be run, preferably the past two hours of quality controlled data from the Mesonet is combined with the data produced by real process (which may have been run without Mesonet data incorporated) in the standard WRF initialization process via WRF 3D-VAR. More or less Mesonet data may be incorporated, though more data increases run time. WRF 3D-VAR creates a new set of lateral and lower boundary conditions that are markedly improved due to the addition of the two hours of Mesonet data. In addition the lead forecaster may make contact with other forecasters associated with the EAS process for the independent verification of the event.

This contact can be provided via the user interface. Given the additional forecast information, if merited, a warning can be sent to the mail address of those parties that will be affected by the significant weather event. This message can also be transmitted via the user interface. In addition the lead forecasters name and telephone number can be included as part of the email to allow the parties affected by the weather event to pose more detailed questions. As the Mesoscale model creates the numerical weather forecast, the model output is verified against Mesonet data later attained during the forecasted window to insure the Mesoscale model has not failed in some unknown manner. This raises confidence in the results of the Mesoscale model. As the significant weather event unfolds the lead forecaster can contact parties affected, giving updates to the progress of the event, and can provide an assessment of the threat posed by the weather event. The threat index described is computed by combining the relevant factors for the parties affect into the geographically and temporally distributed threat index.

If no significant weather event is predicted to occur with the next twenty four hours the lead forecaster can stand down and the EAS process is allowed to continue function without further intervention.

The various EAS system and process examples shown above illustrate a novel Emergency Management system. A user of the present invention may choose any of the above embodiments, or an equivalent thereof, depending upon the desired application. In this regard, it is recognized that various forms of the subject invention could be utilized without departing from the spirit and scope of the present invention.

As is evident from the foregoing description, certain aspects of the present invention are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the sprit and scope of the present invention.

Other aspects, objects and advantages of the present invention can be obtained from a study of the drawings, the disclosure and the appended claims.

APPENDIX I

WRF Namelist options

Description of namelist variables
----------------------------------
For WRF-NMM users, please see Chapter 5 of the WRF-NMM User's Guide for
information on NMM specific settings (http://www.dtcenter.org/wrf-nmm/users)
Note: variables followed by (max_dom) indicate that this variable needs to
    be defined for the nests when max_dom > 1.
&time_control
run_days                          = 1,                ; run time in days
run_hours                         = 0,                ; run time in hours
                                  Note: if it is more than 1 day, one may use both run_days
and run_hours
                                  or just run_hours. e.g. if the total run length is 36 hrs, you
may
                                  set run_days = 1, and run_hours = 12, or run_days = 0,
and run_hours = 36
run_minutes                       = 0,                ; run time in minutes
run_seconds                       = 0,                ; run time in seconds
start_year (max_dom)                  = 2001,             ; four digit year of starting time
start_month (max_dom)                 = 06,               ; two digit month of starting time
start_day (max_dom)                   = 11,               ; two digit day of starting time
start_hour (max_dom)                  = 12,               ; two digit hour of starting time
start_minute (max_dom)                = 00,               ; two digit minute of starting time
start_second (max_dom)                = 00,               ; two digit second of starting time
                                  Note: the start time is used to name the first wrfout file.
                                  It also controls the start time for nest domains, and the
time to restart
tstart (max_dom)                      = 00,               ; FOR NMM: starting hour of the forecast
end_year (max_dom)                    = 2001,             ; four digit year of ending time
end_month (max_dom)                   = 06,               ; two digit month of ending time
end_day (max_dom)                     = 12,               ; two digit day of ending time
end_hour (max_dom)                    = 12,               ; two digit hour of ending time
end_minute (max_dom)                  = 00,               ; two digit minute of ending time
end_second (max_dom)                  = 00,               ; two digit second of ending time
                                  It also controls when the nest domain integrations end
                                  All start and end times are used by real.exe.
                                  Note that one may use either run_days/run_hours etc. or
                                  end_year/month/day/hour etc. to control the length of
                                  model integration. But run_days/run_hours
                                  takes precedence over the end times.
                                  Program real.exe uses start and end times only.
interval_seconds                  = 10800,            ; time interval between incoming real data,
which will be the interval
                                  between the lateral boundary condition file
input_from_file (max_dom)             = T,                ; whether nested run will have input files for
domains other than 1
fine_input_stream (max_dom)           = 0,                ; field selection from nest input for its
initialization
                                  0: all fields are used; 2: only static and time-varying,
masked land
                                  surface fields are used.
history_interval (max_dom)            = 60,               ; history output file interval in minutes
frames_per_outfile (max_dom)          = 1,                ; output times per history output file, used to
split output files
                                  into smaller pieces
restart                           = F, ; whether this run is a restart run
restart_interval                      = 1440,             ; restart output file interval in minutes
io_form_history                       = 2,                ; 2 = netCDF
io_form_restart                       = 2,                ; 2 = netCDF
io_form_input                         = 2,                ; 2 = netCDF
io_form_boundary                      = 2,                ; netCDF format
                        = 4,          ; PHDS format
                        = 5,          ; GRIB1 format
frames_per_emissfile                      = 12, ; Number of times in each chemistry emission file.
io_style_emiss                    = 1,                ; Style to use for the chemistry emission files.
                                  ; 0 = Do not read emissions from files.
                                  ; 1 = Cycle between two 12 hour files (set
frames_per_emissfile=12)
                                  ; 2 = Dated files with length set by frames_per_emissfile
debug_level                       = 0,                ; 50,100,200,300 values give increasing prints APPENDIX I-continued WRF Namelist options

| | | |
|---|---|---|
| To choose between SI and WPS input to real: | | |
| auxinput1_inname | = "met_em.d<domain>.<date>" | ; Input to real from WPS |
| | = "wrf_real_input_em.d<domain>.<date>" ; Input to real from SI | |
| Other output options: | | |
| auxhist2_outname | = "rainfall" ; file name for extra output; if not specified, auxhist2_d<domain>_<date> will be used also note that to write variables in output other than the history file requires Registry.EM file change | |
| auxhist2_interval (max_dom) | = 10, | ; interval in minutes |
| io_form_auxhist2 | = 2, | ; output in netCDF |
| Additional ones when running 3DVAR: | | |
| write_input | = t, | ; write input-formatted data as output |
| inputout_interval | = 180, | ; interval in minutes when writing input-formatted data |
| input_outname | = 'wrf_3dvar_input_d<domain>_<date>'; you may change the output file name | |
| inputout_begin_y | = 0 | |
| inputout_begin_mo | = 0 | |
| inputout_begin_d | = 0 | |
| inputout_begin_h | = 3 | |
| inputout_begin_m | = 0 | |
| inputout_begin_s | = 0 | |
| inputout_end_y | = 0 | |
| inputout_end_mo | = 0 | |
| inputout_end_d | = 0 | |
| inputout_end_h | = 12 | |
| inputout_end_m | = 0 | |
| inputout_end_s | = 0 | ; the above shows that the input-formatted data are output starting from hour 3 to hour 12 in 180 min interval. |
| &domains | | |
| time_step | = 60, | ; time step for integration in integer seconds recommend 6*dx (in km) for typical real-data cases |
| time_step_fract_num | = 0, | ; numerator for fractional time step |
| time_step_fract_den | = 1, | ; denominator for fractional time step Example, if you want to use 60.3 sec as your time step, set time_step = 60, time_step_fract_num = 3, and time_step_fract_den = 10 |
| max_dom | = 1, | ; number of domains - set it to >1 if it is a nested run |
| s_we (max_dom) | = 1, | ; start index in x (west-east) direction (leave as is) |
| e_we (max_dom) | = 91, ; end index in x (west-east) direction (staggered dimension) | |
| s_sn (max_dom) | = 1, | ; start index in y (south-north) direction (leave as is) |
| e_sn (max_dom) | = 82, ; end index in y (south-north) direction (staggered dimension) | |
| s_vert (max_dom) | = 1, | ; start index in z (vertical) direction (leave as is) |
| e_vert (max_dom) | = 28, ; end index in z (vertical) direction (staggered dimension) Note: this refers to full levels including surface and top vertical dimensions need to be the same for all nests Note: most variables are unstaggered (= staggered dim - 1) | |
| dx (max_dom) | = 10000, | ; grid length in x direction, unit in meters |
| dy (max_dom) | = 10000, | ; grid length in y direction, unit in meters |
| ztop (max_dom) | = 19000. | ; used in mass model for idealized cases |
| grid_id (max_dom) | = 1, ; domain identifier | |
| parent_id (max_dom) | = 0, | ; id of the parent domain |
| i_parent_start (max_dom) | = 0, | ; starting LLC I-indices from the parent domain |
| j_parent_start (max_dom) | = 0, | ; starting LLC J-indices from the parent domain |
| parent_grid_ratio (max_dom) | = 1, | ; parent-to-nest domain grid size ratio: for real-data cases the ratio has to be odd; for idealized cases, the ratio can be even if feedback is set to 0. |
| parent_time_step_ratio (max_dom) = 1, | | ; parent-to-nest time step ratio; it can be different from the parent_grid_ratio |
| feedback | = 1, | ; feedback from nest to its parent domain; 0 = no feedback |
| smooth_option | = 0 | ; smoothing option for parent domain, used only with feedback option on. 0: no smoothing; 1: 1-2-1 smoothing; 2: smoothing-desmoothing |

APPENDIX I-continued

WRF Namelist options

```
Namelist variables specifically for the WPS input for real:
num_metgrid_levels          = 27                      ; number of vertical levels of 3d meteorological
fields coming
                                                      ; from WPS metgrid program
interp_type                 = 1                       ; vertical interpolation
                                                      ; 1 = linear in pressure
                                                      ; 2 = linear in log(pressure)
lagrange_order              = 1                       ; vertical interpolation order
                                                      ; 1 = linear
                                                      ; 2 = quadratic
zap_close_levels            = 500                     ; ignore isobaric level above surface if delta p
(Pa) < zap_close_levels
lowest_lev_from_sfc         = .false.                 ; place the surface value into the lowest eta
location
                                                      ; T = use surface value as lowest eta (u,v,t,q)
                                                      ; F = use traditional interpolation
force_sfc_in_vinterp        = 1;                      use the surface level as the lower boundary
when interpolating
                                                      ; through this many eta levels
                                                      ; 0 = perform traditional trapping interpolation
                                                      ; n = first n eta levels directly use surface level
p_top_requested             = 5000                    ; p_top (Pa) to use in the model
Users may explicitly define full eta levels. Given are two distributions for 28 and 35
levels. The number
of levels must agree with the number of eta surfaces allocated (e_vert). Users may
alternatively request
only the number of levels (with e_vert), and the real program will compute values. The
computation assumes
a known first several layers, then generates equi-height spaced levels up to the top of the
model.
eta_levels                  = 1.000, 0.990, 0.978, 0.964, 0.946,
                              0.922, 0.894, 0.860, 0.817, 0.766,
                              0.707, 0.644, 0.576, 0.507, 0.444,
                              0.380, 0.324, 0.273, 0.228, 0.188,
                              0.152, 0.121, 0.093, 0.069, 0.048,
                              0.029, 0.014, 0.000,
eta_levels                  = 1.000, 0.993, 0.983, 0.970, 0.954,
                              0.934, 0.909, 0.880, 0.845, 0.807,
                              0.765, 0.719, 0.672, 0.622, 0.571,
                              0.520, 0.468, 0.420, 0.376, 0.335,
                              0.298, 0.263, 0.231, 0.202, 0.175,
                              0.150, 0.127, 0.106, 0.088, 0.070,
                              0.055, 0.040, 0.026, 0.013, 0.000
Namelist variables for controling the specified moving nest:
        Note that this moving nest option needs to be activated at the compile time by
adding -DMOVE_NESTS
        to the ARCHFLAGS. The maximum number of moves, max_moves, is set to
50
        but can be modified in source code file frame/module_driver_constants.F.
num_moves                   = 4                       ; total number of moves
move_id                     = 2,2,2,2,                ; a list of nest domain id's, one per move
move_interval               = 60,120,150,180, ; time in minutes since the start of this
domain
move_cd_x                   = 1,1,0,-1,; the number of parent domain grid cells to move
in i direction
move_cd_y                   = 1,0,-1,1,; the number of parent domain grid cells to move
in j direction
                              positive is to move in increasing i and j direction, and
                              negative is to move in decreasing i and j direction.
                              0 means no move. The limitation now is to move only 1
grid cell
                              at each move.
Namelist variables for controling the automatic moving nest:
        Note that this moving nest option needs to be activated at the compile time by
adding -DMOVE_NESTS
        and -DVORTEX_CENTER to the ARCHFLAGS. This option uses an mid-
level vortex following algorthm to
        determine the nest move. This option is experimental.
vortex_interval             = 15                      ; how often the new vortex position is computed
max_vortex_speed            = 40                      ; used to compute the search radius for the new
vortex position
corral_dist                 = 8                       ; how many coarse grid cells the moving nest is
allowed to get
                              near the mother domain boundary
&physics
Note: even the physics options can be different in different nest domains,
    caution must be used as what options are sensible to use
```

APPENDIX I-continued

WRF Namelist options

| | | |
|---|---|---|
| chem_opt | = 0, | ; chemistry option - not yet available |
| mp_physics (max_dom) | | microphysics option |
| | = 0, no microphysics | |
| | = 1, Kessler scheme | |
| | = 2, Lin et al. scheme | |
| | = 3, WSM 3-class simple ice scheme | |
| | = 4, WSM 5-class scheme | |
| | = 5, Ferrier (new Eta) microphysics | |
| | = 6, WSM 6-class graupel scheme | |
| | = 8, Thompson et al. scheme | |
| | = 98, NCEP 3-class simple ice scheme (to be removed) | |
| | = 99, NCEP 5-class scheme (to be removed) | |
| For non-zero mp_physics options, to keep Qv .GE. 0, and to set the other moisture fields .LT. a critcal value to zero | | |
| mp_zero_out | = 0, | ; no action taken, no adjustment to any moist field |
| | = 1, | ; except for Qv, all other moist arrays are set to zero ; if they fall below a critical value |
| | = 2, | ; Qv is .GE. 0, all other moist arrays are set to zero ; if they fall below a critical value |
| mp_zero_out_thresh which | = 1.e-8 | ; critical value for moist array threshold, below |
| | | ; moist arrays (except for Qv) are set to zero (kg/kg) |
| ra_lw_physics (max_dom) | | longwave radiation option |
| | = 0, no longwave radiation | |
| | = 1, rrtm scheme | |
| | = 3, cam scheme | |
| | also must set levsiz, paerlev, camabs_dim1/2 (see below) | |
| | = 99, GFDL (Eta) longwave (semi-supported) | |
| | also must use co2tf = 1 for ARW | |
| ra_sw_physics (max_dom) | | shortwave radiation option |
| | = 0, no shortwave radiation | |
| | = 1, Dudhia scheme | |
| | = 2, Goddard short wave | |
| | = 3, cam scheme | |
| | also must set levsiz, paerlev, cam_abs_dim1/2 (see below) | |
| | = 99, GFDL (Eta) longwave (semi-supported) | |
| | also must use co2tf = 1 for ARW | |
| radt (max_dom) | = 30, ; minutes between radiation physics calls recommend 1 min per km of dx (e.g. 10 for 10 km) | |
| nrads (max_dom) | = FOR NMM: number of fundamental timesteps between calls to shortwave radiation; the value is set in Registry.NMM but is overridden by namelist value; radt will be computed from this. | |
| nradl (max_dom) | = FOR NMM: number of fundamental timesteps between calls to longwave radiation; the value is set in Registry.NMM but is overridden by namelist value. | |
| co2tf | CO2 transmission function flag only for GFDL radiation | |
| | = 0, read CO2 function data from pre-generated file | |
| | = 1, generate CO2 functions internally in the forecast | |
| ra_call_offset | radiation call offset | |
| | = 0 (no offset), =-1 (old offset) | |
| cam_abs_freq_s frequency | = 21600 CAM clearsky longwave absorption calculation | |
| | (recommended minimum value to speed scheme up) | |
| levsiz | = 59 for CAM radiation input ozone levels | |
| paerlev | = 29 for CAM radiation input aerosol levels | |
| cam_abs_diml | = 4 for CAM absorption save array | |
| cam_abs_dim2 | = e_vert for CAM 2nd absorption save array | |
| sf_sfclay_physics (max_dom) | | surface-layer option (old bl_sfclay_physics option) |
| | = 0, no surface-layer | |
| | = 1, Monin-Obukhov scheme | |
| | = 2, Monin-Obukhov (Janjic) scheme | |
| | = 3, NCEP Global Forecast System scheme | |
| sf_surface_physics (max_dom) | | land-surface option (old bl_surface_physics option) |
| | = 0, no surface temp prediction | |
| | = 1, thermal diffusion scheme | |
| | = 2, Noah land-surface model | |
| | = 3, RUC land-surface model | |
| bl_pbl_physics (max_dom) | | boundary-layer option |
| | = 0, no boundary-layer | |
| | = 1, YSU scheme | |
| | = 2, Mellor-Yamada-Janjic TKE scheme | |
| | = 3, NCEP Global Forecast System scheme | |
| | = 99, MRF scheme (to be removed) | |

APPENDIX I-continued

WRF Namelist options

| | |
|---|---|
| bldt (max_dom) | = 0, ; minutes between boundary-layer physics calls |
| nphs (max_dom) | = FOR NMM: number of fundamental timesteps between calls to turbulence and microphysics; the value is set in Registry.NMM but is overridden by namelist value; bldt will be computed from this. |
| cu_physics (max_dom) | cumulus option<br>= 0, no cumulus<br>= 1, Kain-Fritsch (new Eta) scheme<br>= 2, Betts-Miller-Janjic scheme<br>= 3, Grell-Devenyi ensemble scheme<br>= 4, Simplified Arakawa-Schubert scheme<br>= 99, previous Kain-Fritsch scheme |
| cudt | = 0, ; minutes between cumulus physics calls |
| ncnvc (max_dom) | = FOR NMM: number of fundamental timesteps between calls to convection; the value is set in Registry.NMM but is overridden by namelist value; cudt will be computed from this. |
| tprec (max_dom) | = FOR NMM: number of hours in precipitation bucket |
| theat (max_dom) | = FOR NMM: number of hours in latent heating bucket |
| tclod (max_dom) | = FOR NMM: number of hours in cloud fraction average |
| trdlw (max_dom) | = FOR NMM: number of hours in short wave buckets |
| trdlw (max_dom) | = FOR NMM: number of hours in long wave buckets |
| tsrfc (max_dom) | = FOR NMM: number of hours in surface flux buckets |
| pcpflg (max_dom) | = FOR NMM: logical switch for precipitation assimilation |
| isfflx | = 1, ; heat and moisture fluxes from the surface (only works for sf sfclay_physics = 1)<br>1 = with fluxes from the surface<br>0 = no flux from the surface |
| ifsnow | = 0, ; snow-cover effects (only works for sf surface_physics = 1)<br>1 = with snow-cover effect<br>0 = without snow-cover effect |
| icloud | = 1, ; cloud effect to the optical depth in radiation (only works for ra_sw physics = 1 and ra_lw physics = 1)<br>1 = with cloud effect<br>0 = without cloud effect |
| swrad_scat | = 1. ; scattering tuning parameter (default 1. is 1.e-5 m2/kg) |
| surface_input_source | = 1, ; where landuse and soil category data come from:<br>1 = SI/gridgen<br>2 = GRIB data from another model (only possible (VEGCAT/SOILCAT are in wrf real_input_em files from SI) |
| num_soil_layers | = 5, ; number of soil layers in land surface model<br>= 5: thermal diffusion scheme<br>= 4: Noah landsurface model<br>= 6: RUC landsurface model |
| ucmcall (0=no, 1=yes) | = 0, ; activate urban canopy model (in Noah LSM only) |
| maxiens | = 1, ; Grell-Devenyi only |
| maxens | = 3, ; G-D only |
| maxens2 | = 3, ; G-D only |
| maxens3 | = 16 ; G-D only |
| ensdim | = 144 ; G-D only<br>These are recommended numbers. If you would like to use any other number, consult the code, know what you are doing. |
| seaice_threshold | = 271 ; tsk <seaice threshold, if water point and 5-layer slab<br>; scheme, set to land point and permanent ice; if water point<br>; and Noah scheme, set to land point, permanent ice, set temps<br>; from 3 m to surface, and set smois and sh2o |
| sst_update | = 0 ; time-varying sea-surface temp (0=no, 1=yes). If selected real<br>; puts SST and VEGFRA in wrflowinp_d01 file, and wrf updates these from it<br>; at same interval as boundary file. To read this, the time-control<br>; namelist must include auxinput5_interval, auxinput5_end h, and<br>; auxinput5_inname = "wrflowinp_d<domain>" |
| &fdda | |
| grid_fdda (max_dom) | = 1 ; grid-nudging fdda on (=0 off) for each domain |
| gfdda_inname | = "wrffdda_d<domain>" ; defined name in real |

APPENDIX I-continued

WRF Namelist options

| | | |
|---|---|---|
| gfdda_interval_m (max_dom) | = 360 | ; time interval (min) between analysis times |
| gfdda_end_h (max_dom) | = 6 | ; time (h) to stop nudging after start of forecast |
| io_form_gfdda | = 2 | ; analysis data io format (2 = netCDF) |
| fgdt (max_dom) | = 0 | ; calculation frequency (minutes) for grid-nudging (0=every step) |
| if_no_pbl_nudging_uv (max_dom) | = 0; | 0= no nudging of u and v in the pH, 1=nudging in the pbl |
| if_no_pbl_nudging_t (max_dom) | = 0 | ; 0= no nudging of temp in the pbl, 1=nudging in the pbl |
| if_no_pbl_nudging_q (max_dom) | = 0 | ; 0= no nudging of qvapor in the pbl, 1=nudging in the pbl |
| if_zfac_uv (max_dom) | = 0 | ; 0= nudge u and v all layers, 1= limit nudging to levels above k_zfac_uv |
| k_zfac_uv (max_dom) | = 10 | ; 10=model level below which nudging is switched off for u and v |
| if_zfac_t (max_dom) | = 0 | ; 0= nudge temp all layers, 1= limit nudging to levels above k_zfac_t |
| k_zfac_t (max_dom) | = 10 | ; 10=model level below which nudging is switched off for temp |
| if_zfac_q (max_dom) | = 0 | ; 0= nudge qvapor all layers, 1= limit nudging to levels above k_zfac_q |
| k_zfac_q (max_dom) | = 10 | ; 10=model level below which nudging is switched off for qvapor |
| guv (max_dom) | = 0.0003 | ; nudging coefficient for u and v (sec-1) |
| gt (max_dom) | = 0.0003 | ; nudging coefficient for temp (sec-1) |
| gq (max_dom) | = 0.0003 | ; nudging coefficient for qvapor (sec-1) |
| if_ramping | = 0 | ; 0= nudging ends as a step function, 1= ramping nudging down at end of period |
| dtramp_min | = 60.0 | ; time (min) for ramping function, 60.0=ramping starts at last analysis time, −60.0=ramping ends at last analysis time |
| The following are for observation nudging: | | |
| obs_nudge_opt (max_dom) | = 1 | ; obs-nudging fdda on (=0 off) for each domain also need to set auxinput11_interval and auxinput11_end_h in time_control namelist |
| max_obs | = 150000 | ; max number of observations used on a domain during any given time window |
| fdda_start | = 0 | ; obs nudging start time in minutes |
| fdda_end | = 180 | ; obs nudging end time in minutes |
| obs_nudge_wind (max_dom) | = 1 | ; whether to nudge wind: (=0 off) |
| obs_coef_wind | = 6.E-4, | ; nudging coefficient for wind, unit: s-1 |
| obs_nudge_temp | = 1 | ; whether to nudge temperature: (=0 off) |
| obs_coef_temp | = 6.E-4, | ; nudging coefficient for temperature, unit: s-1 |
| obs_nudge_mois | = 1 | ; whether to nudge water vapor mixing ratio: (=0 off) |
| obs_coef_mois | = 6.E-4, | ; nudging coefficient for water vapor mixing ratio, unit: s-1 |
| obs_nudge_pstr | = 0 | ; whether to nudge surface pressure (not used) |
| obs_coef_pstr | = 0. | ; nudging coefficient for surface pressure, unit: s-1 (not used) |
| obs_rinxy | = 200., | ; horizonal radius of influence in km |
| obs_rinsig | = 0.1, | ; vertical radius of influence in eta |
| obs_twindo | = 40, | ; half-period time window over which an observation will be used for nudging |
| obs_npfi | = 10, | ; freq in coarse grid timesteps for diag prints |
| obs_ionf | = 2 | ; freq in coarse grid timesteps for obs input and err calc |
| obs_idynin | = 0 | ; for dynamic initialization using a ramp-down function to gradually turn off the FDDA before the pure forecast (=1 on) |
| obs_dtramp | = 40 | ; time period in minutes over which the nudging is ramped down from one to zero. |
| obs_ipf_in4dob | = .true. | ; print obs input diagnostics (=.false. off) |
| obs_ipf_errob | = .true. | ; print obs error diagnostics (=.false. off) |
| obs_ipf_nudob | = .true. | ; print obs nudge diagnostics (=false. off) |
| / | | |
| &dynamics | | |

APPENDIX I-continued

WRF Namelist options

```
dyn_opt                       = 2,                 ; dynamical core option: advanced research WRF
core (Eulerian mass)
rk_ord                        = 3,; time-integration scheme option:
                                    2 = Runge-Kutta 2nd order
                                    3 = Runge-Kutta 3rd order
diff_opt                      = 0,                 ; turbulence and mixing option:
                                    0 = no turbulence or explicit
                                        spatial numerical filters (km_opt IS IGNORED).
                                    1 = evaluates 2nd order
                                        diffusion term on coordinate surfaces.
                                        uses kvdif for vertical diff unless PBL option
                                        is used. may be used with km_opt = 1 and 4.
                                        (= 1, recommended for real-data case when grid
distance < 10 km)
                                    2 = evaluates mixing terms in
                                        physical space (stress form) (x,y,z).
                                        turbulence parameterization is chosen
                                        by specifying km_opt.
km_opt                        = 1,                 ; eddy coefficient option
                                    1 = constant (use khdif kvdif)
                                    2 = 1.5 order TKE closure (3D)
                                    3 = Smagorinsky first order closure (3D)
                                        Note: option 2 and 3 are not recommended for DX >2
km
                                    4 = horizontal Smagorinsky first order closure
                                        (recommended for real-data case when grid distance <
10 km)
damp_opt                      = 0,                 ; upper level damping flag
                                    0 = without damping
                                    1 = with diffusive damping, maybe used for real-data
cases
                                        (dampcoef nondimensional ~0.01-0.1)
                                    2 = with Rayleigh damping (dampcoef inverse time scale
[1/s] e.g. .003;
                                        not for real-data cases)
diff_6th_opt                  = 0,                 ; 6th-order numerical diffusion
                                    0 = no 6th-order diffusion (default)
                                    1 = 6th-order numerical diffusion
                                    2 = 6th-order numerical diffusion but prohibit up-gradient
diffusion
diff_6th_factor               = 0.12,              ; 6th-order numerical diffusion non-dimensional
rate (max value 1.0
timestep)
                                                    corresponds to complete removal of 2dx wave in one
dampcoef (max_dom)            = 0.,                ; damping coefficient (see above)
zdamp (max_dom)               = 5000.,             ; damping depth (m) from model top
w_damping                     = 0,                 ; vertical velocity damping flag (for operational use)
                                    0 = without damping
                                    1 = with damping
base_temp                     = 290.,              ; real-data, em ONLY, base sea-level temp (K)
base_pres                     = 10^5               ; real-data, em ONLY, base sea-level pres (Pa), DO
NOT CHANGE
base_lapse                    = 50.,               ; real-data, em ONLY, lapse rate (K), DO NOT
CHANGE
khdif (max_dom)               = 0,                 ; horizontal diffusion constant (m^2/s)
kvdif (max_dom)               = 0,                 ; vertical diffusion constant (m^2/s)
smdiv (max_dom)               = 0.1,               ; divergence damping (0.1 is typical)
emdiv (max_dom)               = 0.01,              ; external-mode filter coef for mass
coordinate model
                                                    (0.01 is typical for real-data cases)
epssm (max_dom)               = .1,                ; time off-centering for vertical sound waves
non_hydrostatic (max_dom)     = .true.,            ; whether running the model in hydrostatic
or non-hydro mode
pert_coriolis (max_dom)       = .false.,           ; Coriolis only acts on wind perturbation
(idealized)
mix_full_fields(max_dom)      = .true.,            ; used with diff opt = 2; value of ".true." is
recommended, except for
                                                    highly idealized numerical tests; damp_opt must not be 1
if ".true."
                                                    is chosen. .false. means subtract 1-d base-state profile
before mixing
tke_drag_coefficient(max_dom)                      = 0.,                ; surface drag coefficient (Cd,
dimensionless) for diff_opt=2 only
tke_heat_flux(max_dom)                             = 0.,                ; surface thermal flux (H/(rho*cp), K m/s) for
diff_opt=only
h_mom_adv_order (max_dom)                          = 5,                 ; horizontal momentum advection order
(5=5th, etc.)
v_mom_adv_order (max_dom)                          = 3,                 ; vertical momentum advection order
```

APPENDIX I-continued

WRF Namelist options

| | | |
|---|---|---|
| h_sca_adv_order (max_dom) | = 5, | ; horizontal scalar advection order |
| v_sca_adv_order (max_dom) | = 3, | ; vertical scalar advection order |
| pd_moist | = F | ; positive definite advection of moisture |
| pd_scalar | = F | ; positive definite advection of scalars |
| pd_chem | = F | ; positive definite advection of chem variables |
| pd_tke | = F | ; positive definite advection of tke |
| time_step_sound (max_dom) automatically) | = 4 / | ; number of sound steps per time-step (0=set |
| | | (if using a time_step much larger than 6*dx (in km), proportionally increase number of sound steps - also best to use even numbers) |
| &bdy_control | | |
| spec_bdy_width value nudging | = 5, | ; total number of rows for specified boundary |
| spec_zone option) | = 1, | ; number of points in specified zone (spec b.c. |
| relax_zone option) | = 4, | ; number of points in relaxation zone (spec b.c. |
| specified (max_dom) domain 1) | = .false., | ; specified boundary conditions (only for |
| | the above 4 are used for real-data runs | |
| periodic_x (max_dom) | = .false., | ; periodic boundary conditions in x direction |
| symmetric_xs (max_dom) (west) | = .false., | ; symmetric boundary conditions at x start |
| symmetric_xe (max_dom) (east) | = .false., | ; symmetric boundary conditions at x end |
| open_xs (max_dom) | = .false., | ; open boundary conditions at x start (west) |
| open_xe (max_dom) | = .false., | ; open boundary conditions at x end (east) |
| periodic_y (max_dom)direction | = .false., | ; periodic boundary conditions in y |
| symmetric_ys (max_dom) (south) | = .false., | ; symmetric boundary conditions at y start |
| symmetric_ye (max_dom) (north) | = .false., | ; symmetric boundary conditions at y end |
| open_ys (max_dom) | = .false., | ; open boundary conditions at y start (south) |
| open_ye (max_dom) | = .false., | ; open boundary conditions at y end (north) |
| nested (max_dom) | = .false., | ; nested boundary conditions (inactive) |
| &namelist_quilt | Thisnamelist record controls asynchronized I/O for MPI applications. | |
| nio_tasks_per_group | = 0, | default value is 0: no quilting; > 0 quilting I/O |
| nio_groups miscelleneous in &domains: | = 1, | default 1, don't change |
| tile_sz_x | = 0, | ; number of points in tile x direction |
| tile_sz_y | = 0, | ; number of points in tile y direction |
| | | can be determined automatically |
| numtiles items) | = 1, | ; number of tiles per patch (alternative to above two |
| nproc_x | = −1, | ; number of processors in x for decomposition |
| nproc_y | = −1, | ; number of processors in y for decomposition |
| | −1: code will do automatic decomposition | |
| | >1: for both: will be used for decomposition | |

APPENDIX II

Actual choice of parameters for WRF

| | |
|---|---|
| &time_control | |
| run_days | = 0, |
| run_hours | = 9, |
| run_minutes | = 0, |
| run_seconds | = 0, |
| start_year | = 2006, 2006, 2006, |
| start_month | = 07, 07, 07, |
| start_day | = 19, 19, 19, |
| start_hour | = 18, 18, 18, |
| start_minute | = 00, 00, 00, |
| start_second | = 00, 00, 00, |
| end_year | = 2006, 2006, 2006, |
| end_month | = 07, 07, 07, |
| end_day | = 20, 20, 20, |
| end_hour | = 03, 03, 03, |
| end_minute | = 00, 00, 00, |
| end_second | = 00, 00, 00, |
| interval_seconds | = 10800 |
| input_from_file | = .true.,.true.,.true., |
| history_interval | = 10, 10, 10, |
| frames_per_outfile | = 1000, 1000, 1000, |

APPENDIX II-continued

Actual choice of parameters for WRF

| | |
|---|---|
| restart | = .false., |
| restart_interval | = 5000, |
| io_form_history | = 2 |
| io_form_restart | = 2 |
| io_form_input | = 2 |
| io_form_boundary | = 2 |
| debug_level | = 0 |
| / | |
| &domains | |
| time_step | = 20, |
| time_step_fract_num | = 0, |
| time_step_fract_den | = 1, |
| max_dom | = 2, |
| s_we | = 1, 1, 1, |
| e_we | = 72, 100, 82, |
| s_sn | = 1, 1, 1, |
| e_sn | = 72, 91, 85, |
| s_vert | = 1, 1, 1, |
| e_vert | = 41, 41, 41, |
| num_metgrid_levels | = 40, |
| dx | = 9000, 3000, 1000, |

APPENDIX II-continued

| Actual choice of parameters for WRF | |
|---|---|
| dy | = 9000, 3000, 1000, |
| grid_id | = 1, 2, 3, |
| parent_id | = 0, 1, 2, |
| i_parent_start | = 1, 30, 62, |
| j_parent_start | = 1, 26, 25, |
| parent_grid_ratio | = 1, 3, 3, |
| parent_time_step_ratio | = 1, 3, 3, |
| feedback | = 1, |
| smooth_option | = 0 |
| / | |
| &physics | |
| mp_physics | = 8, 8, 8, |
| ra_lw_physics | = 1, 1, 1, |
| ra_sw_physics | = 2, 2, 2, |
| radt | = 30, 30, 30, |
| sf_sfclay_physics | = 3, 3, 3, |
| sf_surface_physics | = 3, 3, 3, |
| bl_pbl_physics | = 1 1, 1, |
| bldt | = 1, 1, 1, |
| cu_physics | = 1, 1, 0, |
| cudt | = 2, 2, 2, |
| isfflx | = 1, |
| ifsnow | = 0, |
| icloud | = 1, |
| surface_input_source | = 2, |
| num_soil_layers | = 6, |
| ucmcall | = 0, |
| mp_zero_out | = 0, |
| maxiens | = 1, |
| maxens | = 3, |
| maxens2 | = 3, |
| maxens3 | = 16, |
| ensdim | = 144, |
| / | |
| &fdda | |
| / | |
| &dynamics | |
| w_damping | = 0, |
| diff_opt | = 1, |
| km_opt | = 4, |
| diff 6th_opt | = 0, |
| diff 6th factor | = 0.12, |
| base_temp | = 290. |
| damp_opt | = 0, |
| zdamp | = 5000., 5000., 5000., |
| dampcoef | = 0.01, 0.01, 0.01 |
| khdif | = 0, 0, 0, |
| kvdif | = 0, 0, 0, |
| non_hydrostatic | = .true., .true., .true., |
| pd_moist | = .false., .false., .false., |
| pd_scalar | = .false., .false., .false., |
| / | |
| &bdy_control | |
| spec_bdy_width | = 5, |
| spec_zone | = 1, |
| relax_zone | = 4, |
| specified | = .true., .false.,.false., |
| nested | = .false., .true., .true., |
| / | |
| &grib2 | |
| / | |
| &namelist_quilt | |
| nio_tasks_per_group = 0, | |
| nio_groups = 1, | |
| / | |

We claim:

1. A method for forecasting weather-related events comprising the steps of:
   combining at a computer system initial large scale model domain boundary conditions based on large scale national weather data combined with local mesonet data from local mesonet weather sensors and forming a Numerical Forecasting Model parameterized and conditioned based on mesoscale data and local environmental condition data;
   generating weather prediction data based on the parameterized and conditioned Numerical Forecasting Model; and
   displaying the weather prediction data at a user interface,
   where said local mesonet weather sensors include one or more of various weather sensors and said local mesonet weather sensors are geographically placed based on one or more of infrastructure data and regional environmental characteristic data.

2. The method as recited in claim 1, where displaying the weather prediction data includes transmitting and displaying graphics data wirelessly and remotely with respect to the computer system to a personal computing device illustrative of the weather prediction data and formatted for displaying on a personal computing device user interface.

3. A system for forecasting weather-related events comprising:
   a network of meteorological weather sensors including one or more weather sensors and said meteorological weather sensors are geographically located based on one or more of infrastructure data and regional environmental characteristic data and communicably linked over a wide area network to a central server;
   a computer system having a memory and one or more processors; and
   one or more processor executable programs stored in the memory and executed by the one or more processors, where the one or more executable programs include;
   instructions for combining initial large scale model domain boundary conditions based on large scale national weather data combined with local mesonet data from the meteorological weather sensors and forming a Numerical Forecasting Model parameterized and conditioned based on mesoscale data and local environmental conditions;
   instructions for generating weather prediction data based on the parameterized and conditioned Numerical Forecasting Model; and
   instructions for displaying the weather prediction data at a user interface of the computer system.

4. The system as recited in claim 3, where instructions for displaying the weather prediction data includes instructions for transmitting and displaying graphics data wirelessly and remotely with respect to the computer system to a personal computing device illustrative of the weather prediction data and formatted for displaying on a personal computing device user interface.

5. A system for predicting weather-related threats, comprising:
   a local mesonet network of meteorological weather monitoring stations having a plurality of monitoring stations communicably linked over a wide area network to a central server where each of said plurality of monitoring stations operable to transmit sensor data to said central server and where each of said plurality of monitoring stations are geographically place based on infrastructure data and regional environmental characteristic data; and
   a computing system communicably linked to said central server over said wide area network and having an initialization module adapted for initializing the boundary conditions for a EAS model domain, where said initialization module has:
   a pre-processing sub-module operable to extract data from a geographic database to define a model domain lower boundary condition;
   a function operable to extract data imported from a large scale national database to define lateral boundary conditions; and a Metgrid function operable to transform the data for the LAS model domain, said computing system further comprising an ingestion module adapted for ingesting initial LAS model domain boundary conditions and combining with Local Mesonet data to get numerical forecasting model by importing the Local Mesonet Data from a Local Mesonet and transformed by a sampling function into a uniform data grid and storing the uniform data grid;

said computing system further comprising a parameterization scheme module adapted for selecting and tuning a parameterization scheme of the numerical forecasting model based at least partially on the Local Mesonet Data; and said computing system further comprising a Prediction module adapted for generating weather prediction data based on the numerical forecasting model and outputting the weather prediction data to a user interface adapted for operator viewing.

6. The system as recited in claim 5, where the local mesonet network of meteorological weather monitoring stations includes a stationery weather monitoring station mounted on an existing infrastructure.

7. The system as recited in claim 6, where outputting the weather prediction data to a user interface includes outputting the weather prediction data wirelessly to a mobile device formatted for graphically displaying on the user interface of the mobile device.

8. A computer system for predicting weather-related threats, comprising:

a computer system having a memory and one or more processors; and one or more processor executable programs stored in the memory and executed by the one or more, processors, where the one or more programs include;

instructions for data ingesting and combining at a computer larger scale numerical weather forecast data with high spatial and high temporal resolution data from a local mesonet thereby creating real time a forecast model having higher spatial and temporal correlation factors between observed and predicted weather conditions;

instructions for quality control processing the data from the local mesonet by determining if the data is within predetermined criteria including one or more of, sensor performance, expected data content, expected data range, temporal data continuity, spatial data consistency and data adjustments for infrastructure; and instructions for generating weather prediction data based on a quality controlled weather forecast mode and outputting the weather prediction data to a user interface for operator viewing.

9. The computer system of claim 8, where the instructions for outputting the weather prediction data includes instructions for wirelessly outputting graphical data illustrative of the weather prediction data to a remote mobile personal computing device formatted for displaying on the user interface of the mobile personal computing device.

10. A computer implemented method for providing environmentally predictive indicators and related threats, comprising the steps of:

assembling at the computer system meteorological sensor data from a plurality of monitoring stations communicably linked over a wide area network and placed geographically based on infrastructure data and natural environmental and man-made regional characteristic data;

time averaging the meteorological sensor data over a one minute period; and transmitting the aggregate meteorological sensor data in a data package to a central server having program instructions where when said program instructions are executed are adapted to perform the steps of:

initializing lateral boundary conditions based on large scale numerical weather forecast data and lower boundary conditions based on climatological geographic data for an earth and atmosphere model domain;

combining model domain boundary conditions and the meteorological sensor data transformed into a uniform data grid for implementing a forecasting model; and generating weather prediction data based on the forecasting model and outputting the weather prediction data to a user interface for operator viewing where instructions for outputting the weather prediction data includes instructions for transmitting graphical data illustrative of the weather prediction data to a mobile personal computing device formatted for displaying on the user interface of the mobile personal computing device.

11. A computer implemented method for generating weather prediction data, comprising the steps of:

receiving from a central server at a uniform time interval for meteorological sensor data; and receiving at a computer system the meteorological sensor data from a plurality of monitoring stations communicably linked over a wide area network and placed geographically based on one or more of infrastructure data and natural environmental data transmitted to the central server, said computer system having program instructions where when said program instructions are executed perform the steps of:

initializing real time lateral boundary conditions based on large scale numerical weather forecast data and lower boundary conditions based on climatological geographic data for an earth and atmosphere model domain, and incorporating the meteorological sensor data from the plurality of monitoring stations to improve real time lateral and lower boundary conditions of a forecasting model;

combining model domain boundary conditions and the meteorological sensor data transformed into a uniform data grid for implementing the forecasting model;

implementing the forecasting model from combining the model domain boundary conditions and the meteorological sensor data; and generating the weather prediction data based on the forecasting model.

12. The computer implemented method as recited in claim 11, further comprising the step of; outputting weather prediction data to a user interface adapted for operator viewing.

13. The computer implemented method as recited in claim 12, where outputting the weather prediction data includes outputting wirelessly to a mobile computing device, the weather prediction data formatted for viewing on the mobile computing device.

14. A computer implemented method for determining a threat index, comprising the steps of:

initializing at a computer lateral boundary conditions based on large scale numerical weather forecast data and lower boundary conditions based on climatological geographic data thereby implementing an earth and atmosphere model domain;

transforming into a uniform data grid sensor data from a local mesonet having a plurality of monitoring stations communicably linked over a wide area network and placed geographically based on infrastructure data and natural environmental data; and combining the earth and atmosphere model domain boundary conditions and the sensor data collected from the local mesonet thereby implementing a forecasting model, and combining one or more of static infrastructure data with the climatological geographic data and the sensor data to determine the threat index.

* * * * *